United States Patent
Sakthivel et al.

(10) Patent No.: US 10,148,353 B2
(45) Date of Patent: Dec. 4, 2018

(54) OPTICAL CABLE SIGNALING SYSTEM

(71) Applicant: Dell Products L.P., Round Rock, TX (US)

(72) Inventors: Marimuthu Sakthivel, Santa Clara, CA (US); Shubhang Chaudhary, Mountain View, CA (US); Joseph LaSalle White, San Jose, CA (US); Vinay Sawal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 6 days.

(21) Appl. No.: 15/449,666

(22) Filed: Mar. 3, 2017

(65) Prior Publication Data

US 2018/0006720 A1    Jan. 4, 2018

Related U.S. Application Data

(63) Continuation-in-part of application No. 15/196,813, filed on Jun. 29, 2016.

(51) Int. Cl.
*G02B 6/00* (2006.01)
*G02F 1/01* (2006.01)
(Continued)

(52) U.S. Cl.
CPC ....... *H04B 10/07955* (2013.01); *G01M 11/00* (2013.01); *H04B 10/07* (2013.01); *H04B 10/516* (2013.01); *G02B 6/14* (2013.01)

(58) Field of Classification Search
CPC ........ G02B 6/4457; G02B 2006/12119; G02B 6/2934; H04B 10/556; H04B 10/80;
(Continued)

(56) References Cited

U.S. PATENT DOCUMENTS 4,721,351 A  *  1/1988  Goepfert ................ G02B 6/266
                                                   359/900
4,725,124 A  *  2/1988  Taylor ................... G02F 1/0134
                                                   385/13
(Continued)

OTHER PUBLICATIONS

Vinay Sawal, Marimuthu Sakthival and Shubhang Chaudhary, "Signaling Method for Leveraging Power Attenuation in a Mandrel-Wrapped Optical Fiber," U.S. Appl. No. 15/196,813, filed Jun. 29, 2016, 36 Pages.

*Primary Examiner* — Kaveh C Kianni
*Assistant Examiner* — Hung Lam
(74) *Attorney, Agent, or Firm* — Haynes and Boone, LLP

(57) ABSTRACT

An optical cable signaling system includes an optical cable and an endpoint device that is connected to the optical cable. An optical cable signaling device is provided in the optical cable signaling system for signaling using the optical cable, and includes a first optical cable manipulation subsystem and a second optical cable manipulation subsystem. An optical cable signaling actuator on the optical cable signaling device is configured to move the first optical cable manipulation subsystem relative to the second optical cable manipulation subsystem to physically manipulate the optical cable such that a parameter of an optical signal transmitted through the optical cable changes. An optical cable signaling engine in the optical cable signaling device is configured to actuate the optical cable signaling actuator to communicate information to the endpoint device via changes in the parameter of the optical signal transmitted through the optical cable.

18 Claims, 17 Drawing Sheets

(51) Int. Cl.
  *G02B 6/26* (2006.01)
  *G02B 6/42* (2006.01)
  *G02B 6/36* (2006.01)
  *H04B 10/079* (2013.01)
  *H04B 10/516* (2013.01)
  *G01M 11/00* (2006.01)
  *H04B 10/07* (2013.01)
  *G02B 6/14* (2006.01)

(58) Field of Classification Search
  CPC .......... H04B 10/07955; H04B 10/0775; H04B 10/0791; H04B 10/0795
  USPC ............ 385/1, 3, 13, 19, 25, 32, 82, 83, 118, 385/135, 136, 140
  See application file for complete search history.

(56) References Cited

U.S. PATENT DOCUMENTS

| | | | | |
|---|---|---|---|---|
| 5,029,978 A | * | 7/1991 | Curtis | G02F 1/0134 385/3 |
| 2005/0041902 A1 | * | 2/2005 | Frigo | G01M 11/088 385/1 |

* cited by examiner

OPTICAL CABLE SIGNALING SYSTEM

CROSS-REFERENCE TO RELATED APPLICATIONS

This is a Continuation-In-Part Application for U.S. application Ser. No. 15/196,813, filed Jun. 29, 2016, entitled "SIGNALING METHOD FOR LEVERAGING POWER ATTENUATION IN A MANDREL-WRAPPED OPTICAL FIBER," the disclosure of which is incorporated herein by reference in its entirety.

BACKGROUND

The present disclosure relates generally to information handling systems, and more particularly to signaling information handling systems using an optical cable that connects those information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An IHS can be configured in several different configurations ranging from a single, stand-alone computer system to a distributed, multi-device computer system, to a networked computer system with remote or cloud storage systems.

An information handling system can be a part of a data center that includes a plurality of information handling systems interconnected via a plurality of cables of one or more cable types (e.g., twisted pair copper, optical fiber, etc.). Those of ordinary skill in the field of data centers and data center infrastructure will appreciate that the number of cables employed in a large data center is generally very large. In addition, efficient and accurate cable management is a critical requirement for proper functioning and maintenance of a commercial or industrial data center, where availability expectations routinely exceed 99.5%. This is particularly true when equipment is upgraded to add capacity and bandwidth.

A fiber optic cable presents unique cable management challenges in terms of identifying and tracing a cable non-intrusively because conventional optical fiber testers require the cable to be unplugged from the source and connected to the tester. Nevertheless, anecdotal data suggests that the misconfiguration of optical cables, e.g., by plugging one or both of the cable's endpoints, may occur fairly frequently.

Identifying an incorrectly routed optical fiber by tracing the cable to its endpoints cannot be done with a conventional optical tester without unplugging one or both of the endpoints. In addition, speculatively unplugging one or more cables in an attempt to trace or identify the cable or its endpoints is a less than ideal approach. A similar challenge arises when maintenance personnel generate and/or update "cable tags," tags attached to a cable that identify the cable to which the tag is affixed. When unplugging the cables is not an option, they usually trace the cables to identify the endpoints and update the corresponding tags.

Accordingly, it would be desirable to provide an improved endpoint signaling system.

SUMMARY

In accordance with disclosed subject matter, issues associated with non-intrusively tracing or otherwise identifying a particular cable in a data center or other similar environment are addressed.

In accordance with a disclosed method, a parameter of an optical signal transmitted between two endpoints via an optical fiber is monitored. The physical position and orientation of the optical fiber may be manipulated to modulate or otherwise vary the monitored parameter without disconnecting either endpoint of the optical fiber. Data in accordance with the modulation of the monitored parameter may be identified.

Manipulating the optical fiber may include modifying a position or orientation of at least some portion of the optical fiber without disconnecting the optical fiber from either of the two endpoints. A portion of the optical fiber may be wrapped around a high order mode filter (HOMF). The HOMF may include a grooved cylinder or mandrel suitable for wrapping the optical fiber around.

The optical signal may be transmitted from a first endpoint to the second endpoint and the monitored parameter may include a received power parameter indicative of an average power of the optical signal as received at the second endpoint. The HOMF may be a variable diameter HOMF and manipulating the optical fiber may include varying the HOMF between a smaller, wrapped diameter and a larger, unwrapped diameter in accordance with a data pattern. e.g., the wrapped diameter corresponds to "1" and the unwrapped diameter corresponds to "0".

The wrapped diameter and the unwrapped diameter may be defined relative to a threshold diameter, above which the monitored parameter may show little, if any, dependence on the HOMF diameter. Similarly, the optical fiber's mode volume and signal power is substantially independent of HOMF diameter for HOMF diameters greater than the threshold diameter.

The wrapped portion of the optical fiber may include five turns of the HOMF or some other number of turns. The received power parameter corresponding to the unwrapped diameter of the HOMF may exceed the received power parameter corresponding to the wrapped diameter by a value in a range of approximately 5% to 10%.

In at least some embodiments, a ratio of the unwrapped diameter to the wrapped diameter is in a range of approximately 1.1 to 1.5 and the optical fiber comprises a 62.5 micron multimode fiber core within a 3 mm jacket.

The data pattern may include a sequence of binary data points and manipulating the optical fiber may include, for each of the binary data points, maintaining the HOMF diameter at either the wrapped diameter or the unwrapped diameter, in accordance with the particular data point, for a minimum duration or pulse width. If a sensor at one of the endpoints detects the monitored parameter within a particular range for the minimum duration, a valid 1 or 0 is recognized.

The minimum pulse width may be on the order of 1 to 10 seconds. In at least one embodiment, the binary data points are processed and signaled at a rate of approximately 0.2 Hz.

According to one embodiment, an optical cable signaling device includes a first optical cable manipulation subsystem; a second optical cable manipulation subsystem; an optical cable signaling actuator that is configured to move the first optical cable manipulation subsystem relative to the second optical cable manipulation subsystem to physically manipulate an optical cable and change a parameter of an optical signal transmitted through the optical cable; and a cable signaling engine that is configured to actuate the cable signaling actuator to communicate, to an endpoint device that is coupled to the optical cable, information via the changes in the parameter of the optical signal that is transmitted through the optical cable.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that, for simplicity and clarity of illustration, elements illustrated in the figures have not necessarily been drawn to scale. For example, the dimensions of some of the elements may be exaggerated relative to other elements. Embodiments incorporating teachings of the present disclosure are shown and described with respect to the figures presented herein, in which.

DETAILED DESCRIPTION

Figure 1:
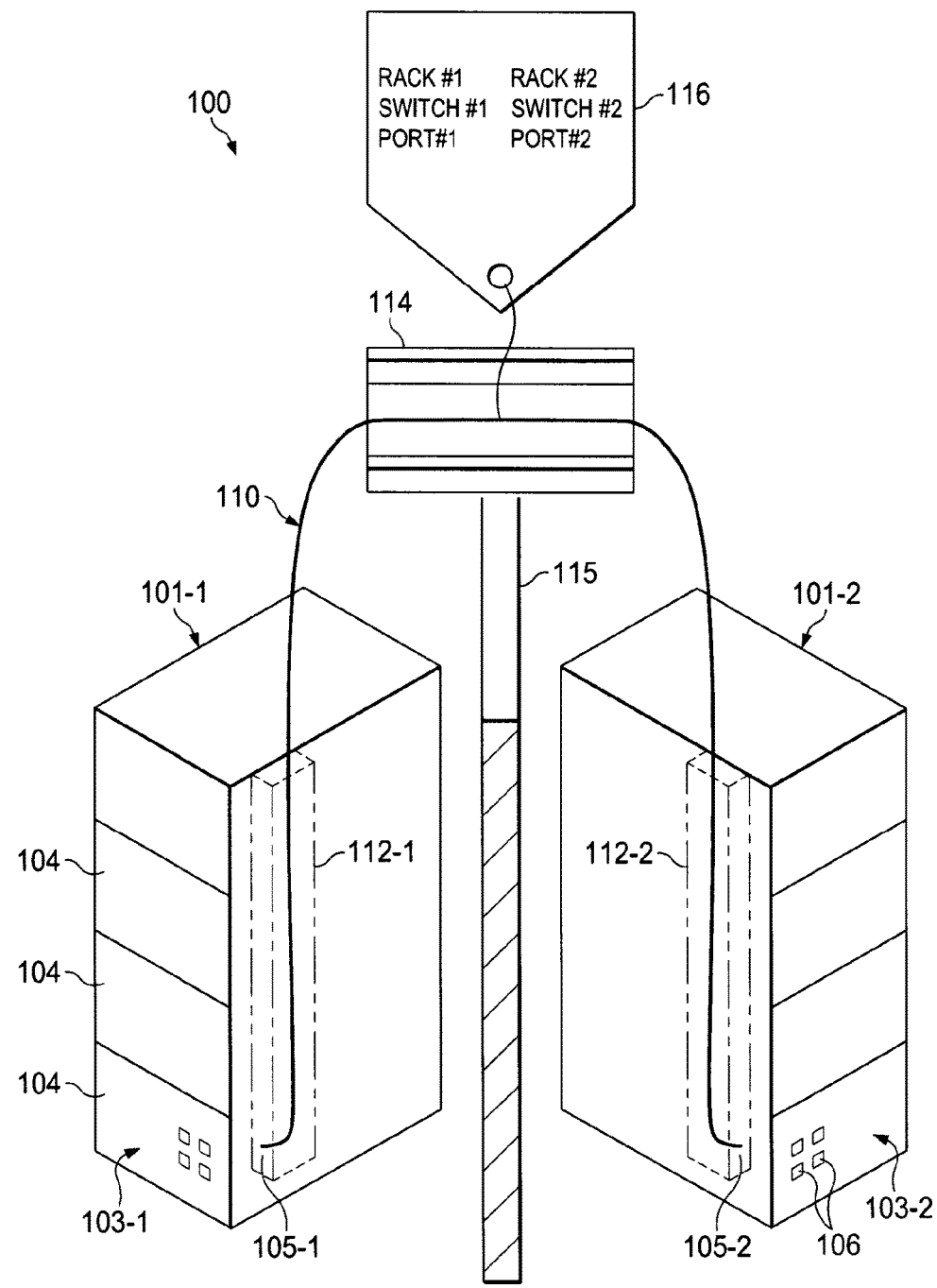
FIG. 1 is a perspective/schematic view illustrating an embodiment of two information handling system racks and an optical fiber connecting an information handling system in one of the racks to an information handling system in the other rack.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In the following detailed description, specific exemplary embodiments in which disclosed subject matter may be practiced are described in sufficient detail to enable those skilled in the art to practice the disclosed embodiments. For example, details such as specific method orders, structures, elements, and connections have been presented herein. However, it is to be understood that the specific details presented need not be utilized to practice embodiments of disclosed subject matter. It is also to be understood that other embodiments may be utilized and that logical, architectural, programmatic, mechanical, electrical and other changes may be made within the scope of the disclosed subject matter.

The following detailed description is, therefore, not to be taken as limiting the scope of the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features may be described which may be exhibited by some embodiments and not by others. Similarly, various requirements may be described which may be requirements for some embodiments but not for other embodiments.

It is understood that the use of specific component, device, and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different elements, features, protocols, or concept names are utilized. Thus, each term utilized herein is to be given its broadest interpretation given the context in which that term is utilized.

FIG. 1 illustrates elements of an information handling system data center 100 in which an optical fiber 110 connects a first rack server, or another type of information handling resource 103-1, in a drawer 104 of a first information handling system rack 101-1 to a second rack server or other type of information handling resource 103-2 of a second information handling system rack 101-2.

The drawers 104 of information handling system rack 101 may each include one or more information handling system resources 103. The drawers 104 illustrated in FIG. 1 include light emitting diodes 106 to indicate status and/or data traffic activity of different information handling resources 103 and/or communication ports (not explicitly shown).

The optical fiber 110 of FIG. 1 is shown traversing a path from a first endpoint 105-1 at its connection with first information handling resource 103-1, through a first cable conduit 112-1, a cable tray 114 that extends over or through a wall 115, and a second cable conduit 112-2 to a second endpoint 105-2 at its connection with second information handling resource 103-2. This path, which is not unusual for cables in a data center 100 of any appreciable size, suggests the potential difficulty of tracing one of a large number of cables between its two endpoints or determining the endpoints of a particular cable selected at a midpoint. FIG. 1 illustrates a cable tag 116, which is a physical tag tied or otherwise affixed to a midpoint of optical fiber 110 and includes a printed or handwritten identification of its endpoints, specified in terms of rack, drawer, switch, port, etc. The endpoint identification that cable tag 116 provides may greatly improve the efficiency with which a maintenance or field technician can perform a particular cabling task. Determining accurate endpoint information for a cable tag 116, however, is generally laborious and time consuming for the very reasons that make cable tags 116 useful, i.e., the difficulty of tracing one of many cables, often identical or similar in appearance to other cables, between endpoints that may be located in different rooms over a path that may include opaque and/or hidden conduits and cable trays that render a visual trace of a cable extremely difficult.

Figure 2:
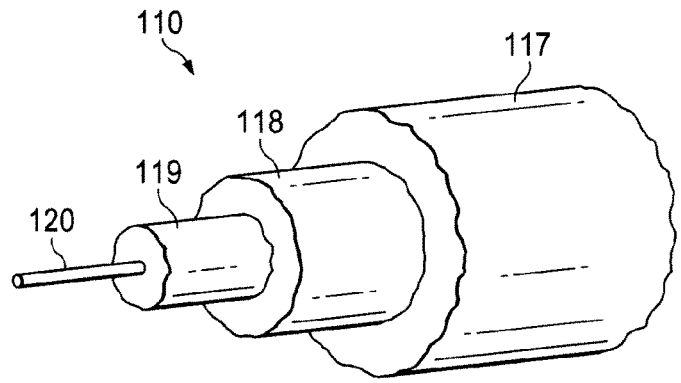
FIG. 2 is a cut-away cross sectional view illustrating an embodiment of an optical fiber.

FIG. 2 illustrates physical elements of a fiber optic cable 110. The fiber optic cable 110 illustrated in FIG. 2 includes a glass or translucent plastic fiber core 120, a cladding 119 surrounding fiber core 120, a buffer 118 surrounding cladding 119, and a jacket 117 surrounding buffer 118. In multimode embodiments of data center 100, example diameters of the fiber optic elements illustrated in FIG. 2 include 50 and 62.5 μm diameters for fiber core 120, a 125 μm outer diameter for cladding 119, a 250 μm outer diameter for buffer 118, and an outer diameter of 300 μm or more for jacket 117. Diameters for the illustrated elements of optical fiber 110 may differ in other embodiments. Some embodiments of optical fiber 110 may omit cladding 119 and/or omit jacket 117 while some embodiments may include multiple concentric buffers 118, e.g., primary and second buffers.

Multimode embodiments of optical fiber 110 may exhibit shape-dependent characteristics. More specifically, optical fiber 110 may exhibit optical and/or data transmission properties that vary when an orientation, arrangement, or configuration of the optical fiber 110 includes portions that are bent or curved. As an example, wrapping a portion of a multimode optical fiber around a cylindrical volume, alternatively referred to herein as a mandrel or HOMF, may attenuate a power of the signal transmitted through the fiber core due to a dispersion of higher order modes occurring in the wrapped portion of the optical fiber. The relationship between an optical signal parameter and the curvature of the optical fiber may be non-linear.

Anecdotal evidence suggests that a multimode optical fiber may transmit data equally well under two different physical configurations, one of which attenuates the signal power or another parameter of the optical signal. The two physical configurations may include a first configuration that encompasses a straight line configuration as well as curved or non-straight line configurations that produce little or no attenuation of optical signal power or another parameter of interest. The second configuration may include configurations in which a curvature of at least a portion of the optical cable is sufficient to achieve an observable and statistically significant attenuation of the parameter of interest while producing no or substantially no degradation of maximum data rate, bit error rate, or similar performance parameters.

The first and second configurations of the optical fiber may both include curved or wrapped portions. As a non-limiting example, a multimode optical fiber that includes a portion wrapped around a cylindrical volume may exhibit little or no appreciable attenuation of signal power or another parameter of interest for cylinder diameters exceeding some specific threshold. Advantageously, the difference between a non-attenuating diameter of the cylindrical volume and an attenuating diameter may be sufficiently small to make feasible a mechanized and/or automated control of the parameter of interest to implement a signaling technique that leverages the attenuating and shape-dependent characteristics of the optical fiber.

By controllably modulating the curvature of an optical fiber, resulting modulations of the parameter of interest can be detected at one or both of the optical fiber endpoints. If the curvature of the optical fiber is controllably modulated between two distinct curvatures, one of which is attenuating and one of which is non-attenuating, the parameter of interest may be digitized, i.e., represented in either of two particular states or values. In this manner, the optical fiber may be physically manipulated to convey out-of-band binary data, between the two endpoints.

Beneficially, the manipulation required to achieve the desired modulation may be performed without disconnecting the optical fiber from its endpoints. Accordingly, a randomly selected optical fiber can be manipulated to transmit a signal that can be optically or electrically observed at the endpoints, thereby automatically associating accurate endpoint data with the selected optical fiber.

Figure 3:
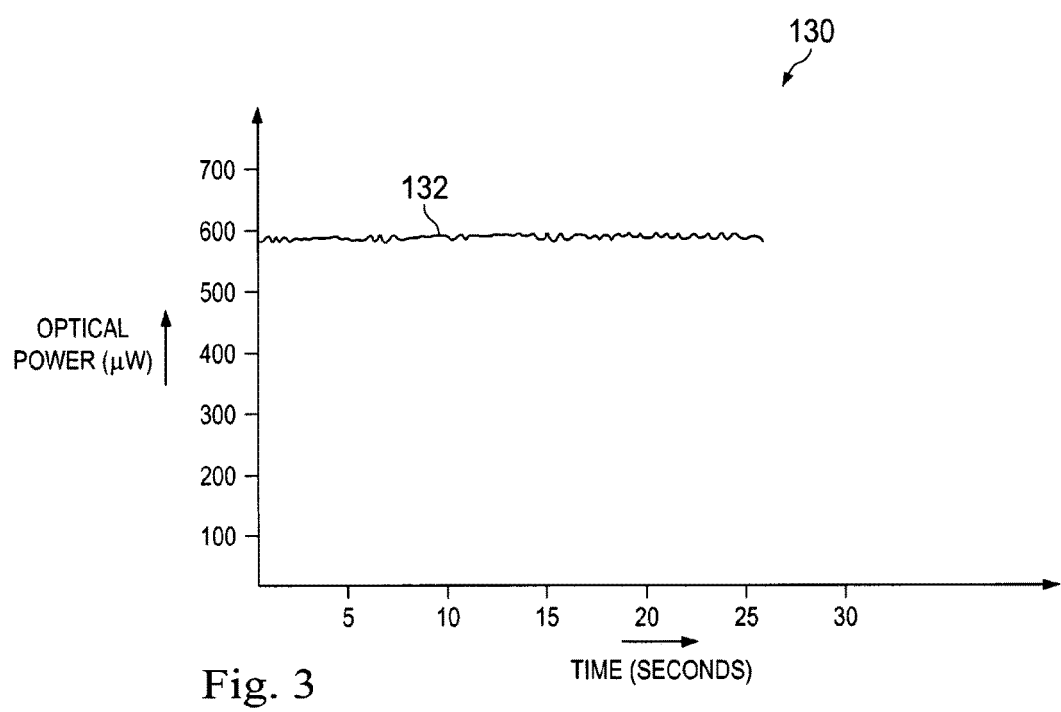
FIG. 3 is a plot view illustrating an embodiment of an optical signal parameter as a function of time.

FIG. 3 illustrates a plot 130 of a parameter of interest, associated with an optical signal transmitted via an optical fiber, as a function of time. The plot 130 corresponds to an interval during which the configuration of the applicable optical fiber was not altered or not altered sufficiently to attenuate the monitored parameter. For the plot 130 illustrated in FIG. 3, the monitored parameter is the signal power of the optical signal as received at a receiving endpoint. The plot line 132 illustrates that the received power is substantially independent of the transmitted data, varying by approximately 0.5% or less throughout the plotted interval of time, which is roughly 25 to 30 seconds as plotted in FIG. 3. The plot line 132 of FIG. 3 indicates a received signal power of slightly less than 600 microwatts, which may be used at the value associated with a first of two binary states of the received power.

Figure 4A:
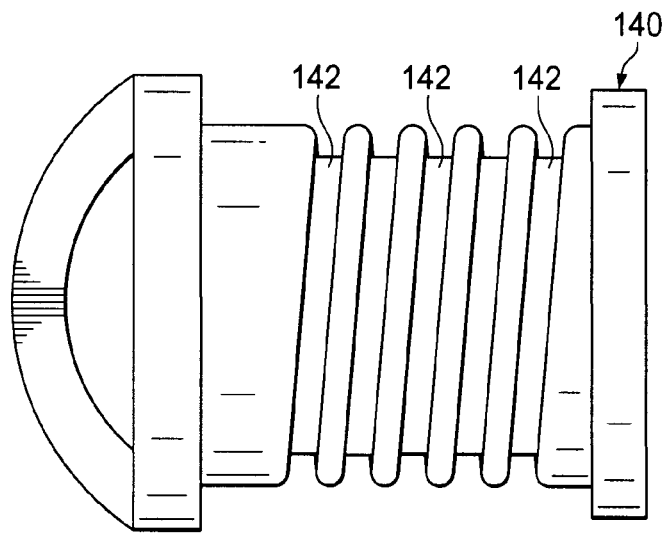
FIG. 4A is a perspective view illustrating an embodiment of a HOMF.

Before considering received power characteristics of an optical fiber that is manipulated in a controlled and intended manner to attenuate the parameter of interest, FIG. 4A illustrates a side elevation view of a mandrel 140 that may serve as the cylindrical volume around which an optical fiber may be wrapped to achieve a desired attenuation of the parameter of interest. The mandrel 140 illustrated in FIG. 4A includes a threaded groove pattern 142 that facilitates a mandrel wrapping process in which an optical fiber is wrapped around the mandrel 140, using the threaded groove pattern as a guide to minimize overlap and control the number of windings included in the wrapped portion. The threaded groove pattern 142 of the mandrel 140 illustrated in FIG. 4A is configured to accommodate an optical fiber 110 and to create a wrapped portion of the optical fiber that circumnavigates the mandrel roughly five times. The diameter of mandrel 140 is less than a threshold diameter, which may be a function of the optical core diameter as well as one or more of various other factors including the dimensions and compositions of all of the various elements of the optical fiber 110 (see FIG. 2). The mandrel 140 may have a particular diameter intended for use in conjunction with a particular optical fiber configuration. In such cases, the mandrel diameter is designed to be less than a threshold diameter, which may be a function of the optical fiber configuration. A minimum diameter of the mandrel may be specified by an optical fiber standard to prevent physical breakdown of the optical fiber 110.

In at least one embodiment, the mandrel diameter is selected to satisfy two objectives. The mandrel diameter may be chosen to achieve a particular attenuation of the parameter of interest. In the case of optical signal power as the parameter of interest, the mandrel diameter may be chosen to achieve a statistically significant and observable attenuation without impacting data transmission performance of the optical fiber 110.

In at least one embodiment, a mandrel diameter associated with an optical signal power attenuation of approximately 5 to 10% may be selected. In the non-limiting example of a 62.5/125 multimode fiber with a 3 mm jacket, i.e., a multimode fiber having a fiber core diameter of 62.5 microns and a 125 micron cladding outer diameter, wrapping the optical fiber around a 17 mm mandrel five times may produce a power attenuation of approximately 6% for a signal with a nominal power of roughly 600 microwatts. The power attenuation achieved with any particular mandrel diameter may be influenced by one or more other parameters and other embodiments may call for different mandrel diameters.

Figure 4B:
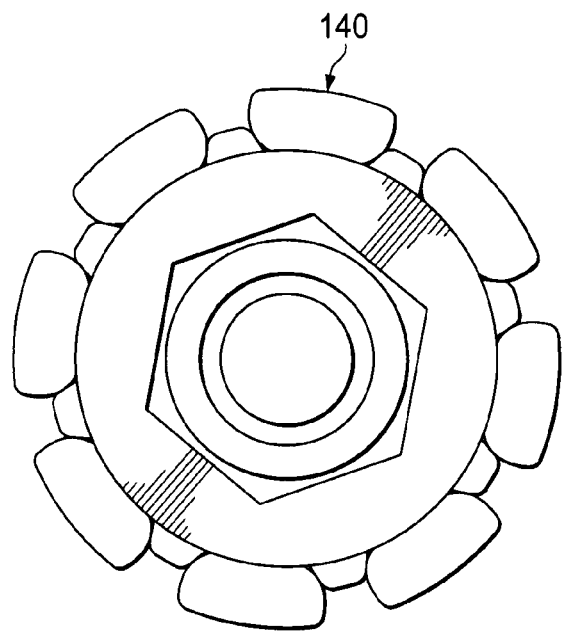
FIG. 4B is a side view illustrating an embodiment of a HOMF.

FIG. 4B illustrates a variable diameter mandrel 140 that may be controllably transitioned between at least two different states corresponding to two different mandrel diameters. In some embodiments, the variable diameter mandrel may support two or more of diameter configurations that are stable. In some embodiments, the variable diameter mandrel may be operable with substantially any diameter with a particular range between a mandrel minimum diameter and a mandrel maximum diameter. The variable diameter mandrel may be configured to adjust the mandrel diameter, electrically, mechanically, or a combination of both. In at least one embodiment, the variable diameter mandrel 140 of FIG. 4B includes an embedded controller that supports a serial communication interface and includes control resources to control the diameter in accordance with one or more messages communicated to and from the variable diameter mandrel via the serial communication interface.

Figure 5:
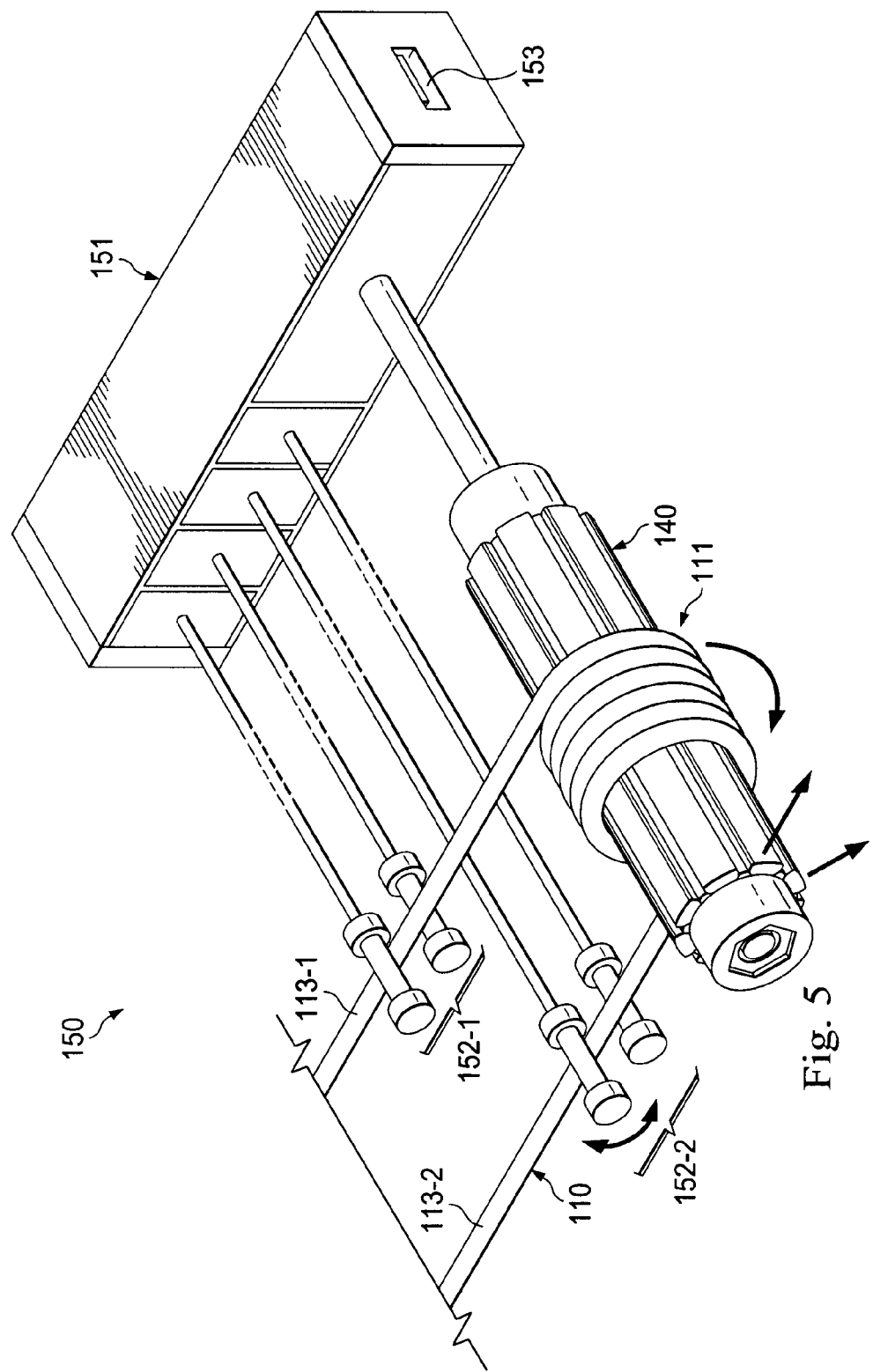
FIG. 5 is a perspective view illustrating an embodiment of an apparatus for manipulating a diameter of a wrapped portion of an optical fiber to modulate or attenuate a power of an optical signal transmitted via the optical fiber.

FIG. 5 illustrates mandrel control assembly 150 including the variable diameter mandrel 140 and two pairs of fiber control rollers 152-1 and 152-2 coupled to a controller 151 that includes a universal serial bus (USB) connector 153. In at least one embodiment, controller 151 includes an embedded controller and firmware, i.e., program instructions executable by the embedded controller, stored in flash memory or another non-volatile storage resource. The controller's firmware may include a self-sufficient module for controlling the variable diameter mandrel 140 and the fiber control roller pairs 152 to adjust the mandrel diameter among two or more particular values of mandrel diameters.

Controller 151 may further support a communication protocol with an information handling system (not shown) coupled to controller 151 via USB interface 153 or any of a number of serial communication protocols. The amount and/or rate of information exchanged between the information handling system and controller 151 may be sufficiently low to permit the use of lower bandwidth serial communication protocols including, as an example, I2C.

FIG. 5 further illustrates an optical fiber 110 including a wrapped portion 111 comprising a portion of optical fiber 110 wrapped around variable diameter mandrel 140. The fiber control roller pairs 152-1 and 152-2 respectively engage incoming and outgoing portions 113-1 and 113-2 of optical fiber 110 to manage optical fiber slack and tension whenever controller 151 changes the diameter of variable diameter mandrel 140.

Diameter control request messages may be generated by the information handling system as part of a cable management application or program to monitor optical signal power or another parameter of interest while manipulating the mandrel diameter to generate a modulated out-of-band signal in accordance with diameter-based modulations of the signal power. In at least one embodiment, the cable management application may simultaneously monitor the transmitted power of a group of endpoints, e.g., all endpoints of a rack, a rack drawer, and so forth, to determine which endpoint corresponds to the wrapped cable.

The controller 151 may include a WiFi or other wireless communication interface and the cable management application may execute on or communicate with a mobile information handling system including, as non-limiting examples, a laptop, smart phone, tablet, or other suitable wireless information handling system. In these embodiments, the cable management application may determine which endpoint senses an optical fiber signal exhibiting a modulating signal power and communicate the endpoint information to the mobile information handling system. In this manner, a technician armed with a mobile information handling system may mandrel wrap a randomly selected optical fiber with the mandrel control assembly 150, initiate execution of the cable management application to control the mandrel diameter as desired, and receive the endpoint information for the optical fiber via the mobile information handling system. In this manner, cable tag information can be generated and verified quickly and accurately.

Figure 6:
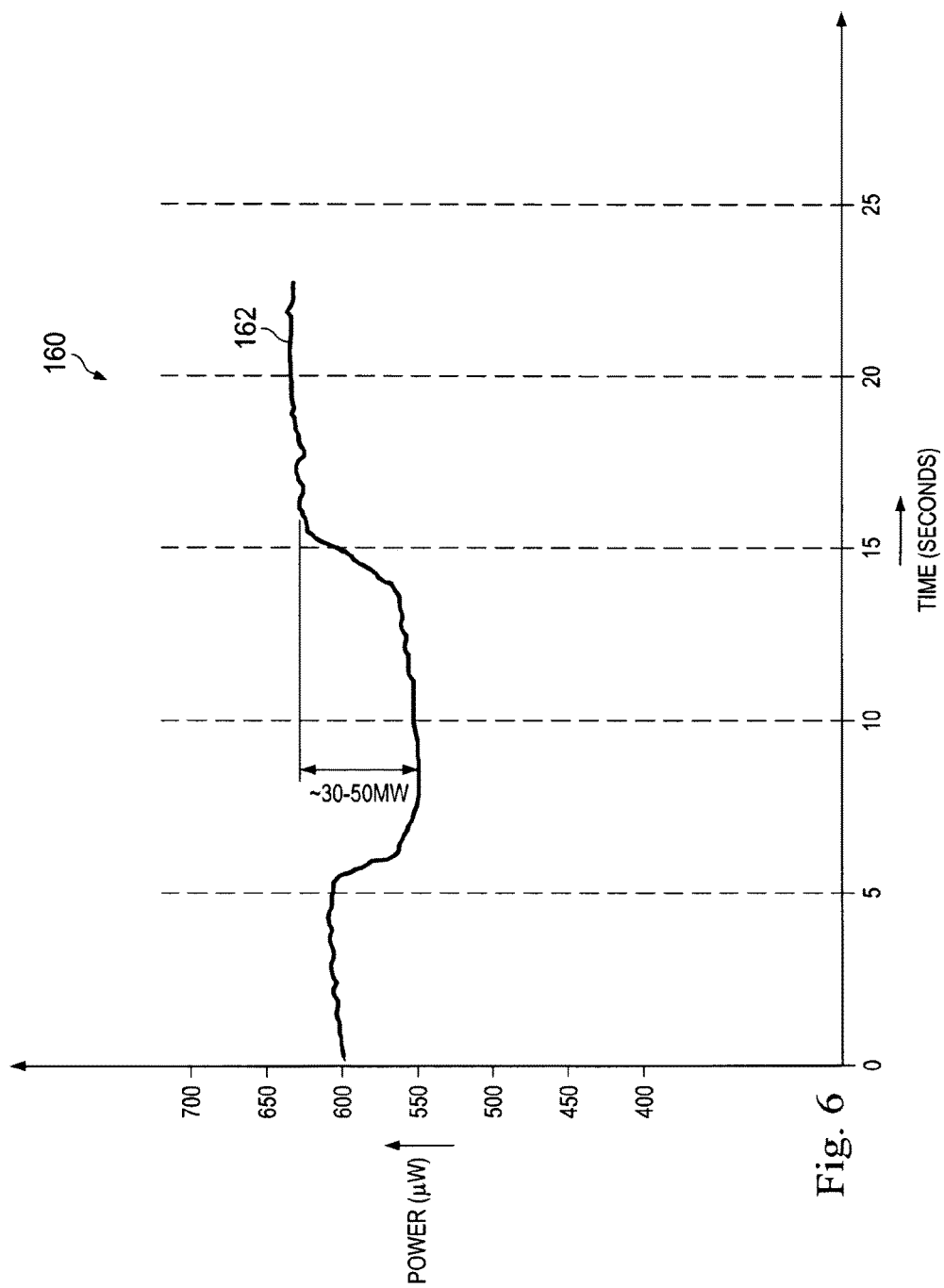
FIG. 6 is a plot view illustrating an embodiment of the optical signal parameter as a function of time while manipulating the optical fiber with the apparatus of FIG. 5.

FIG. 6 illustrates a plot 160 of a monitored parameter of an optical signal transmitted via optical fiber 110 as the optical fiber is manipulated as described in the preceding description. In the plot 160 illustrated in FIG. 6, mandrel diameter has been controlled to oscillate between two diameters at a prescribed rate. The plot line 162 illustrates the monitored parameter, which is the received power of the applicable optical signal oscillating between two values of power differentiated by roughly 30-50 microwatts.

The plot line 162 may be representative of an embodiment in which the optical fiber 110 has a 62.5 micron fiber core within a 3 mm optical fiber jacket and the variable diameter mandrel oscillates between a non-attenuating diameter of approximately 22 mm and an attenuating diameter of approximately 17 mm. The plot line 162 indicates that the signal power is roughly equal to the signal power of the straight line optical fiber plotted in FIG. 3 when the non-attenuating mandrel diameter is operative. Plot line 162 further illustrates a power attenuation of roughly 30 to 50 microwatts, which is roughly 5% to 9% of the non-attenuated power.

Accordingly, FIG. 6 illustrates an embodiment in which a decrease of roughly 23% in mandrel diameter, from 22 mm to 17 mm, produces a decrease of roughly 5% to 9% in average power. Analogous power attenuations may be observed in configurations that employ 50/125 optical fiber, i.e., 50 micron optical core diameter, using similar or different values of attenuating and non-attenuating mandrel diameters. As indicated previously, the power attenuation is not associated with any corresponding drop in data transmission rates or bit error rates. Accordingly, cable management techniques disclosed herein may be performed while user data is being transmitted via the optical fibers being monitored.

Figure 7:
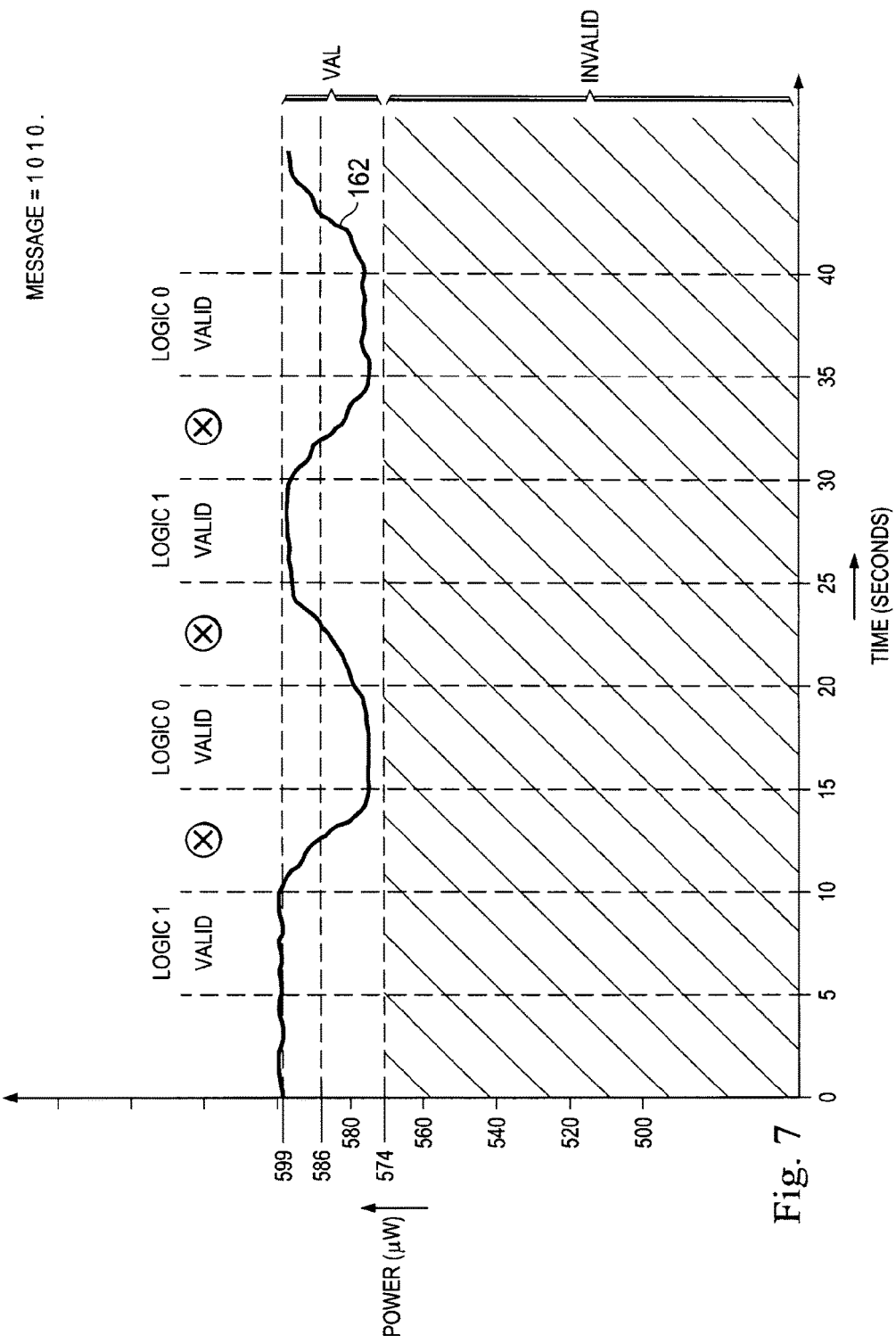
FIG. 7 is a plot view illustrating an embodiment of binary data extracted from the plot of FIG. 6 in accordance with a signaling protocol.

FIG. 7 conveys an interpretation of the modulated plot line 162 of FIG. 6 according to a cable management signal protocol. As illustrated in FIG. 7, a cable management signaling protocol may define a first range of optical signal power as a valid range for a binary 0 and a second range of optical signal power for a valid range for a binary 1. FIG. 7 further illustrates that a valid binary 1 is recognized when the optical signal power remains in the second range of optical signal power for a particular interval of time. The interval of time illustrated in FIG. 7 is approximately 5 seconds, but other embodiments may employ shorter or longer intervals. FIG. 7 similarly illustrates a valid 0 occurring when the optical signal power remains within the first valid range for the particular interval of time.

The optical fiber 110 may be coupled to an optical cable interface (not depicted) at each of its endpoints. The optical cable interface may include one or more sensors to measure or monitor one or more parameters of the optical signal. The sensors may include an optical signal power sensor that samples the power of the optical fiber from time to time, e.g., at 1 Hz, 2 Hz, or the like. Optical signal power sensors may include one or more photodiodes selected for their responsiveness in the applicable wavelengths. A valid 1 or 0 may be recognized when each of the readings of the monitored parameter remain in one of the two valid ranges for the minimum duration. Although FIG. 7 suggests that the minimum duration for a valid binary 1 and a valid binary 0 are the same, other embodiments may use different durations for valid 1s and 0s.

FIG. 7 illustrates the optical fiber generating a binary data signal including the binary message 1-0-1-0. The transmission rate is approximately 1 bit/10 seconds after accounting for the approximately 5 second transitions of the plot line 162 between valid intervals of binary data. The message generated in accordance with disclosed cable management techniques may comply with standardized messages and message protocols.

For example, a messaging protocol may define a standard preamble of two or more binary digits to identify protocol-compliant messages. In this embodiment, the cable management application may produce endpoint information only upon observing a power modulation sequence in compliance with the standardized preamble. As another example, the cable management application may enable a technician to transmit a message indicating that the applicable cable is about to be disconnected. If an endpoint detecting such a message is transmitting data, the endpoint may initiate responsive action including, as examples, requesting the technician not to disconnect the optical fiber, rerouting data traffic, etc. Still other embodiments may support different messages for other purposes.

Figure 8:
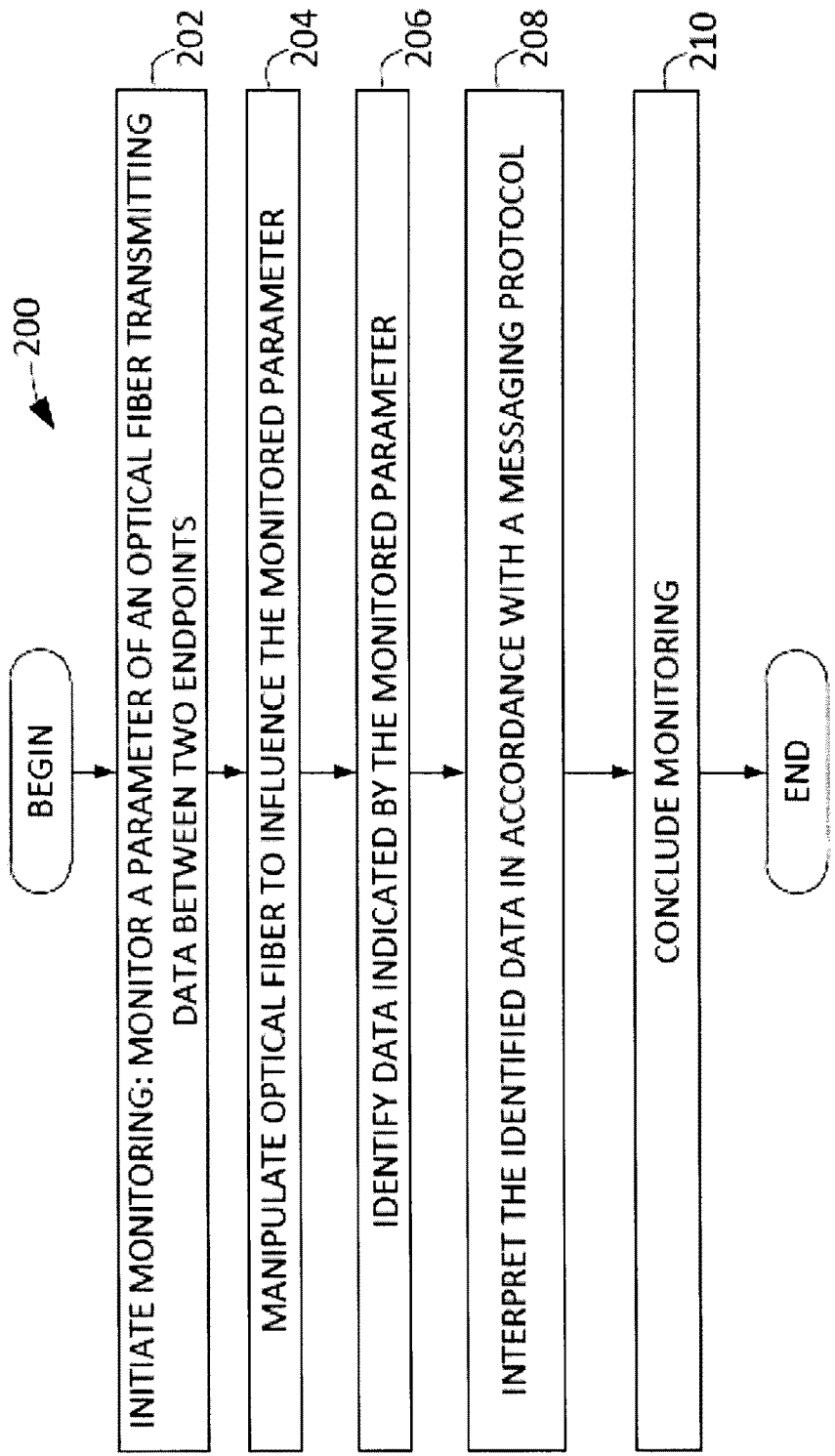
FIG. 8 is a flow chart illustrating an embodiment of a method for providing an optical fiber signaling process.

FIG. 8 illustrates a flow diagram of a cable management application 200. The cable management application 200 may be executed entirely or partially by an embedded controller in the mandrel diameter control assembly 150 of FIG. 5 or by a general purpose central processing unit of an information handling system coupled to the mandrel diameter control assembly. Similarly, a mobile information handling system in wireless communication with the mandrel diameter control assembly 150 may perform all or portions of method 200.

The method 200 illustrated in FIG. 8 includes initiating (block 202) the monitoring of one or more optical signal parameters of interest for an optical signal transmitting data between two endpoints via a corresponding optical fiber. While monitoring the parameter(s) of interest, the position, configuration, and/or orientation of at least a portion of the optical fiber is manipulated (block 204) to attenuate, modulate, or otherwise influence the parameter(s) of interest. As described in the preceding paragraphs, the parameter of interest may be or include the optical signal power and manipulating the optical fiber may include mandrel wrapping the optical fiber and subsequently controlling a diameter of the mandrel in a time-synchronized manner to produce a desired modulation of the parameter of interest.

A sensor or other resource at an endpoint of the optical fiber may sense the parameter of interest and, in conjunction with a cable management application that supports a particular messaging protocol, identify (block 206) data indicated by the monitored parameter. The identification of data illustrated in FIG. 7 is an example.

The method 200 illustrated in FIG. 8 further includes interpreting (block 208) the data identified in block 206. Interpreting data may be achieved in conjunction with the messaging protocol as previously described. For example, interpreting identified data may include recognizing data that begins with a recognized preamble and ignoring data that lacks a recognized preamble. The monitoring of the parameter of interest may be concluded (block 210) following the interpretation of identified data. Other embodiments may implement continuous monitoring of the parameter of interest.

Figure 9:
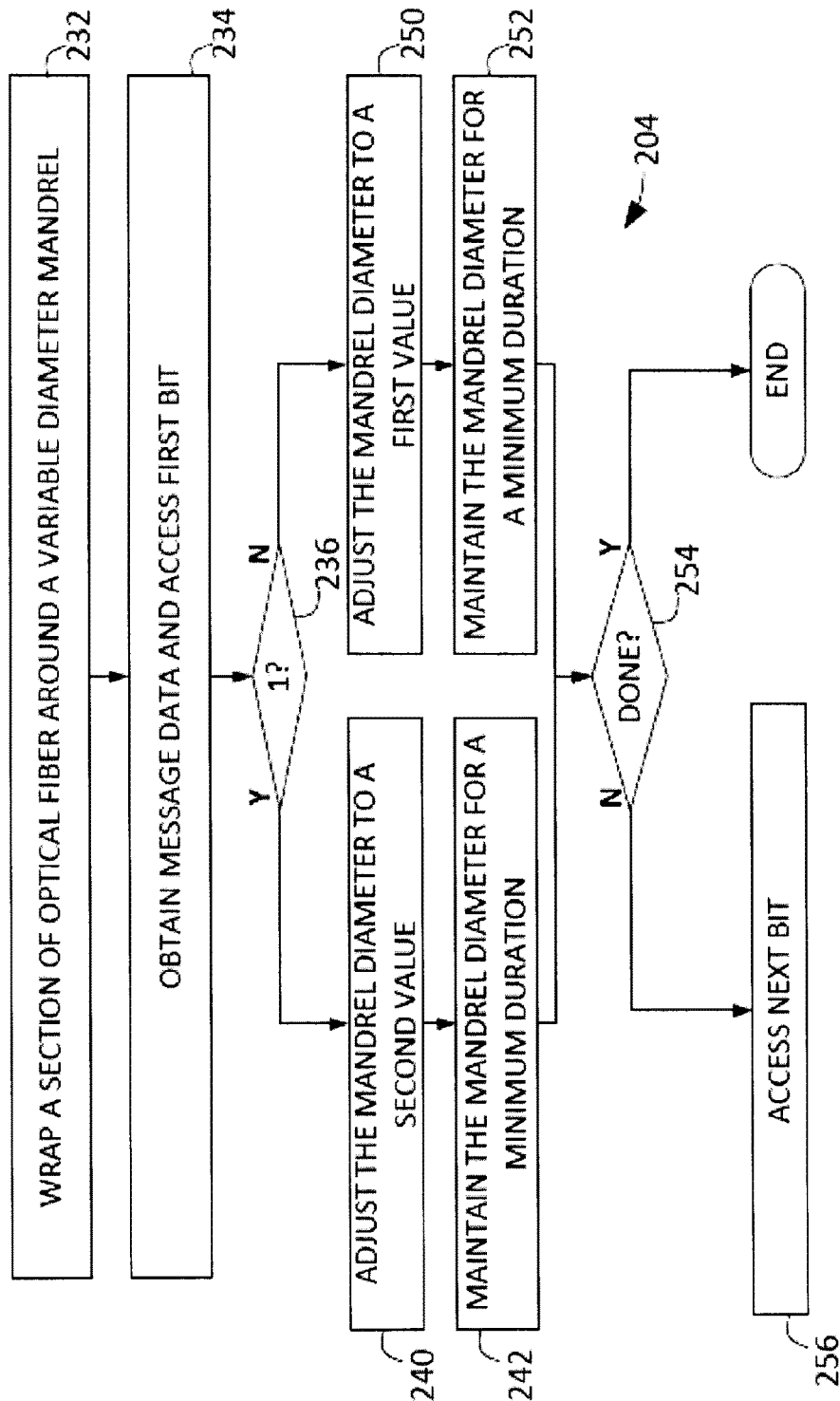
FIG. 9 is a flow chart illustrating an embodiment of a method for manipulating the optical fiber to provide the optical fiber signaling process of FIG. 8.

FIG. 9 illustrates a flow diagram including detail of the optical fiber manipulation operation 204 of the cable management process 200 of FIG. 8. In FIG. 9, the manipulation operation 204 includes wrapping (block 232) a section of the optical fiber around a variable diameter mandrel. A mandrel controller or other resource may access or obtain (block 234) message data including a sequence of binary data points. For each of the data points in the message data, the mandrel controller or other resource may determine (block 236) whether the data point is a binary 1. For binary 1 data points, the illustrated manipulation process 204 adjusts (block 240) the mandrel diameter to a second diameter and maintains (block 242) the mandrel diameter at the second diameter for a minimum duration. For binary 0 data points, the illustrated manipulation process 204 adjusts (block 250) the mandrel diameter to a first diameter and maintains (block 252) the mandrel diameter at the first diameter for the minimum duration. The first and second diameters correspond to an attenuating diameter and a non-attenuating diameter of the mandrel such that the applicable optical fiber signals a binary value in accordance with the mandrel diameter.

After signaling a 1 or 0 associated with a particular data point, the manipulation operation 204 illustrated in FIG. 9 determines (block 254) whether the data message includes additional data points. If so, the illustrated operation accesses (block 256) the next binary data point and returns to operation 236. If operation 254 determines that there are no more messages, the operation completes.

Any one or more processes or methods described above, including processes and methods associated with the FIG. 8 and FIG. 9 flow diagrams, may be embodied as a computer readable storage medium or, more simply, a computer readable medium including processor-executable program instructions, also referred to as program code or software, that, when executed by the processor, cause the processor to perform or otherwise result in the performance of the applicable operations.

While the mandrel control assembly 150 discussed above with reference to FIG. 5 provides for the benefits discussed above, the inventors of the present disclosure have developed a more robust mandrel control assembly (referred to below as an "optical cable signaling device") that includes a more robust configuration (e.g., fewer moving parts) and that has been found to provide for a more uniform physical manipulation of optical cables that produces a more uniform change/modulation/attenuation of the parameter of interest associated with the transmission of the optical signal through the optical cable. That improved optical cable signaling device is described in detail below, along with other features of the optical cable signaling system of the present disclosure that are envisioned as being helpful in understanding the operation of the optical cable signaling system. While elements of the optical cable signaling system discussed below that are similar to those described above may be explicitly called out, one of skill in the art in possession of the present disclosure should recognize similar elements in the discussions above and below whether or not they are explicitly called out.

Figure 10:
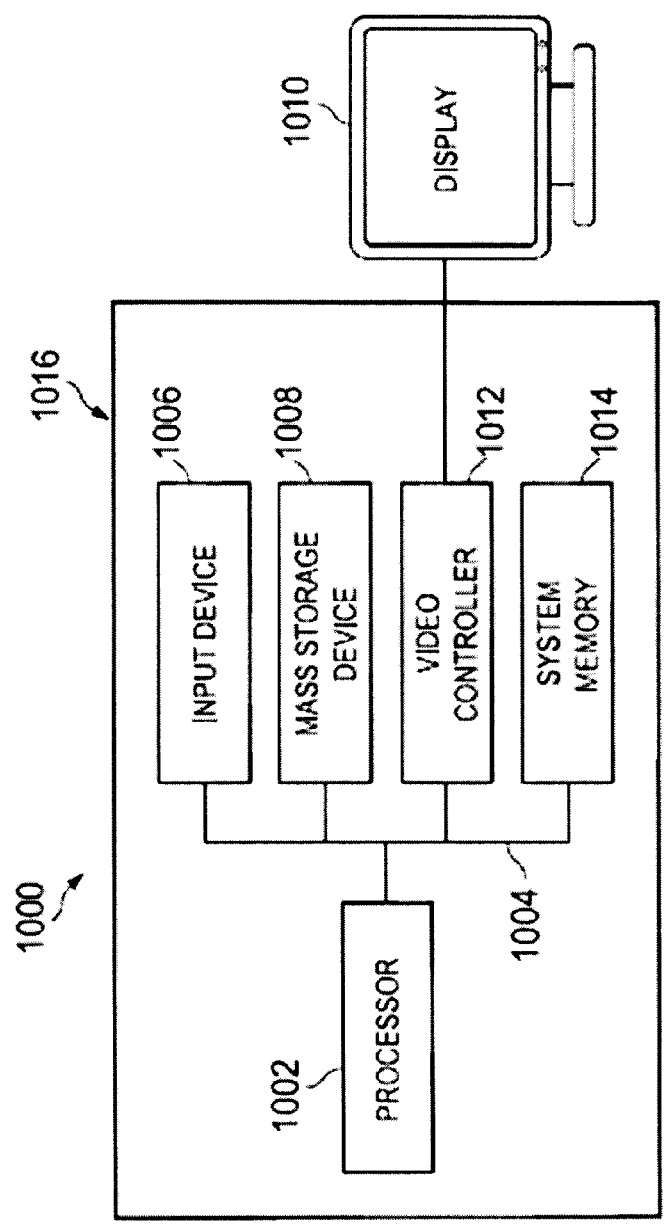
FIG. 10 is a schematic view illustrating an embodiment of an information handling system.

Referring now to FIG. 10, an IHS 1000 is illustrated that includes a processor 1002, which is connected to a bus 1004. Bus 1004 serves as a connection between processor 1002 and other components of IHS 1000. An input device 1006 is coupled to processor 1002 to provide input to processor 1002. Examples of input devices may include keyboards, touchscreens, pointing devices such as mouses, trackballs, and trackpads, and/or a variety of other input devices known in the art. Programs and data are stored on a mass storage device 1008, which is coupled to processor 1002. Examples of mass storage devices may include hard discs, optical disks, magneto-optical discs, solid-state storage devices, and/or a variety other mass storage devices known in the art. IHS 1000 further includes a display 1010, which is coupled to processor 1002 by a video controller 1012. A system memory 1014 is coupled to processor 1002 to provide the processor with fast storage to facilitate execution of computer programs by processor 1002. Examples of system memory may include random access memory (RAM) devices such as dynamic RAM (DRAM), synchronous DRAM (SDRAM), solid state memory devices, and/or a variety of other memory devices known in the art. In an embodiment, a chassis 1016 houses some or all of the components of IHS 1000. It should be understood that other buses and intermediate circuits can be deployed between the components described above and processor 1002 to facilitate interconnection between the components and the processor 1002.

Figure 11:
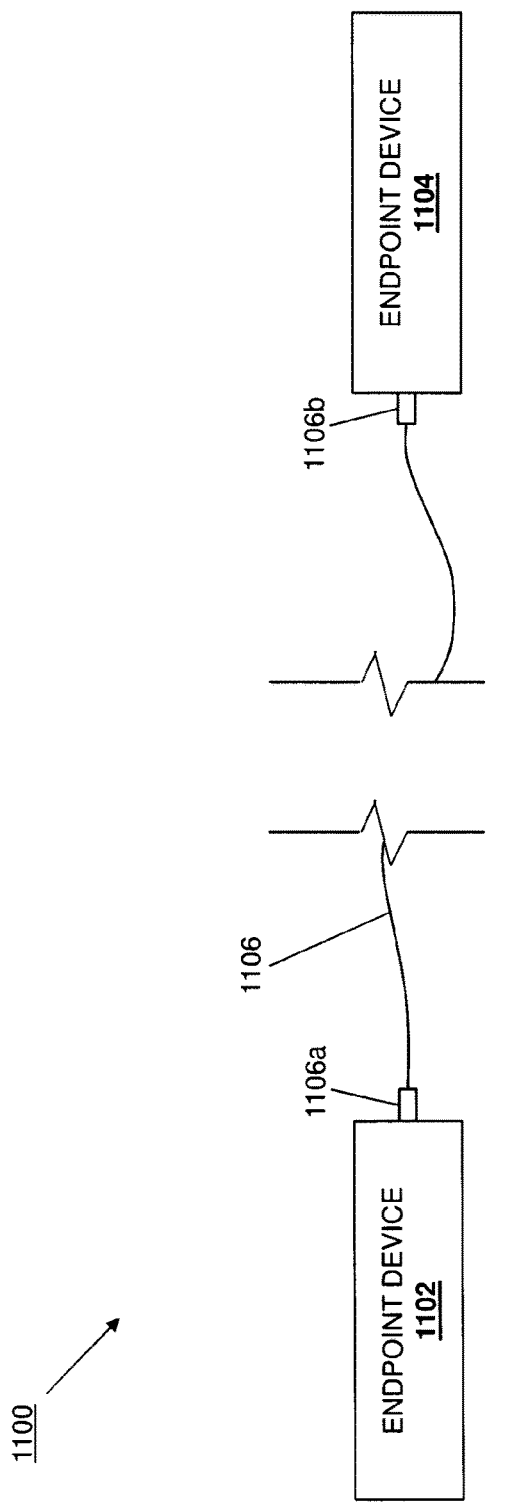
FIG. 11 is a schematic view illustrating an embodiment of a portion of an optical cable signaling system including endpoint devices coupled together by an optical cable.

Referring now to FIG. 11, an embodiment of a portion of an optical cable signaling system 1100 is illustrated. In the illustrated embodiment, the portion of the optical cable signaling system 1100 includes an endpoint device 1102 coupled to an endpoint device 1104 by an optical cable 1106. For example, the optical cable 1106 may be provided by a variety of optical cables (e.g., fiber optic cables) known in the art, and may be coupled to the endpoint device 1102 via a first connector 1106a, and coupled to the endpoint device 1104 via a second connector 1106b. In an embodiment, either or both of the endpoint devices 1102 and 1104 may be the IHS discussed above with reference to FIG. 10 and/or may include some or all of the components of the IHS 100. For example, the endpoint devices 1102 and 1104 may be provided by servers, switches, storage systems, desktop computing devices, laptop/notebook computing devices, and/or other computing devices known in the art. With reference to the discussions above, the optical cable 1106 may be provided by the optical fiber/fiber optic cable 110 discussed above with reference to FIGS. 1 and 2, while the endpoint device 1102 may be provided by the information handling system resource 103-1 discussed above with reference to FIG. 1 (e.g., in the drawer 104 of the first information handling system rack 101-1), and the endpoint device 1104 may be provided by the information handling resource 103-2 discussed above with reference to FIG. 1 (e.g., in the second information handling system rack 101-2.) However, other types of optical cables and/or other configurations of endpoint devices (and/or other devices connected by an optical cable) will benefit from the teachings of the present disclosure and thus are envisioned as falling within its scope.

Figure 12:
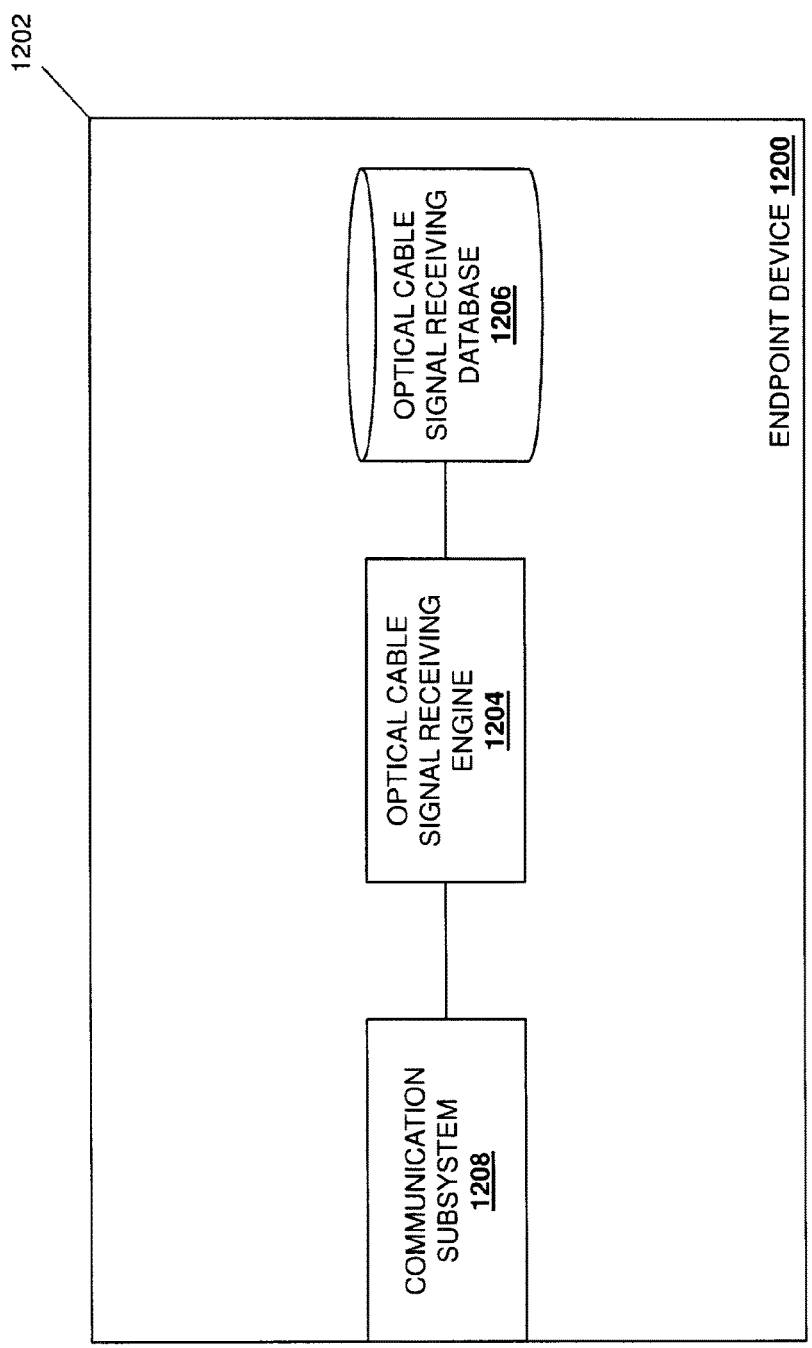
FIG. 12 is a schematic view illustrating an embodiment of an endpoint device in the portion of the optical cable signaling system of FIG. 11.

Referring now to FIG. 12, an embodiment of an endpoint device 1200 is illustrated that may be provided as either of the endpoint devices 1102 and 1104 discussed above with reference to FIG. 11. As such, the endpoint device 1200 may be the IHS 100 discussed above with reference to FIG. 11 and/or may include some or all of the components of the IHS 100, and in specific embodiments may be a server, a switch, a storage system, a desktop computing device, a laptop/notebook computing device, and/or other computing devices known in the art. In the illustrated embodiment, the endpoint device 1200 includes a chassis 1202 that houses the components of the IHS 1200, only some of which are illustrated in FIG. 12. For example, the chassis 1202 may house a processing system (not illustrated, but which may include the processor 1002 discussed above with reference to FIG. 10) and a memory system (not illustrated, but which may include the system memory 1014 discussed above with reference to FIG. 10) that includes instructions that, when executed by the processing system, cause the processing system to provide an optical cable signal receiving engine 1204 that is configured to perform the functions of the optical cable signal receiving engines and endpoint devices discussed below.

The chassis 1202 may also house a storage system (not illustrated, but which may include the storage device 1008 discussed above with reference to FIG. 10) that is coupled to the optical cable signal receiving engine 1204 (e.g., via a coupling between the storage system and the processing system) and that includes an optical cable signal receiving database 1206 that is configured to store information that may be utilized in providing the functionality discussed below. The chassis 1202 may also house a communication subsystem 1208 that is coupled to the optical cable signal receiving engine 1204 (e.g., via a coupling between the communication subsystem and the processing system) and that may include a network interface controller (NIC), a wireless communication subsystem (e.g., a BLUETOOTH® wireless communication subsystem, a Near Field Communication (NFC) subsystem, and/or other wireless communication subsystems known in the art), and/or a variety of other communication components known in the art. As such, the communication subsystem 1208 may include a port that may be connected to a connector (e.g., the first connector 1106a or the second connector 1106b) on the cable 1106 discussed above with reference to FIG. 11. While a specific endpoint device 1200 has been illustrated and described, one of skill in the art in possession of the present disclosure will recognize that endpoint devices may include other components that provide for conventional endpoint device functionality, as well as the functionality discussed below, while remaining within the scope of the present disclosure.

Figure 13A:
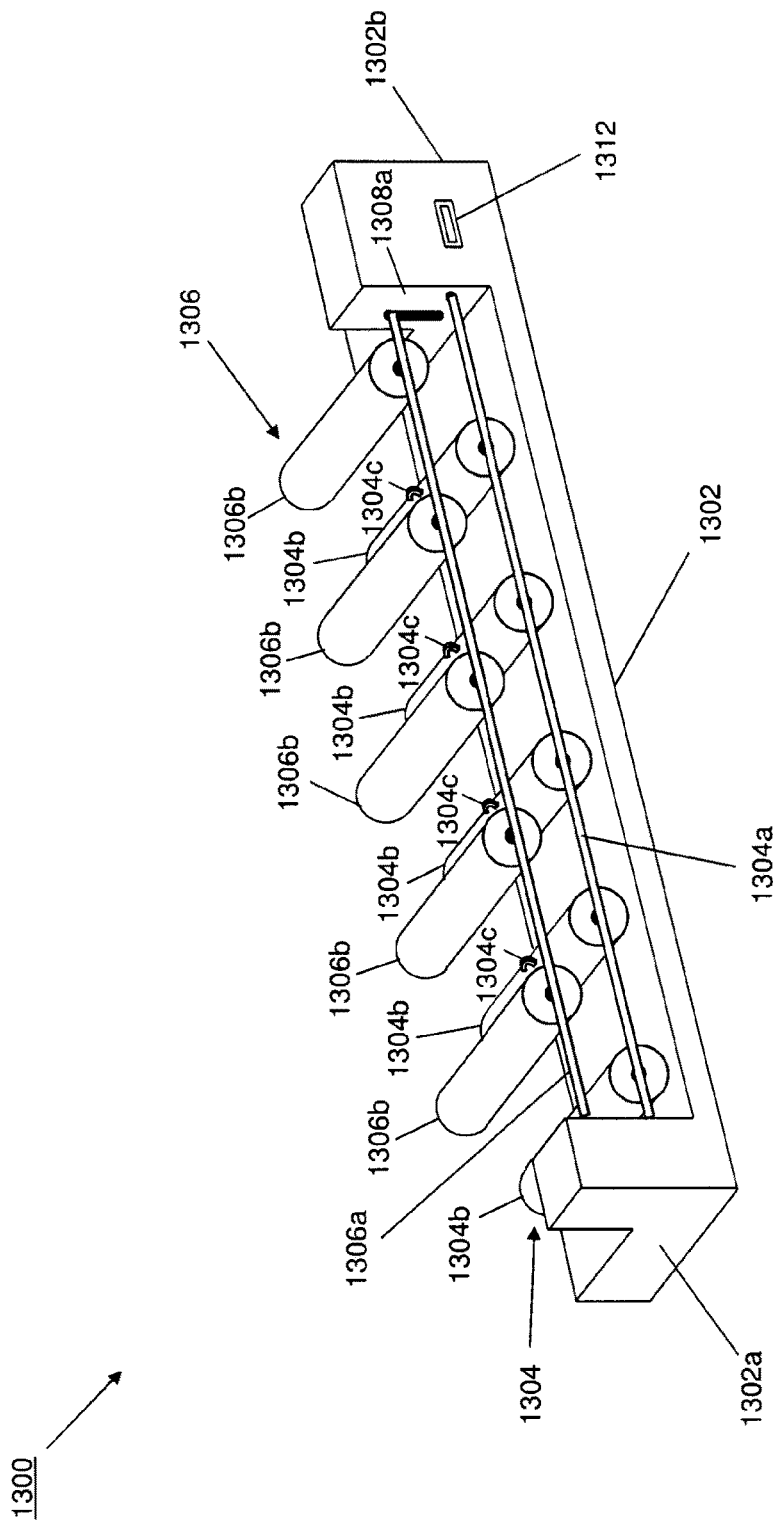
FIG. 13A is a perspective view illustrating an embodiment of an optical cable signaling device that may be used in the optical cable signaling system of the present disclosure.
Figure 13B:
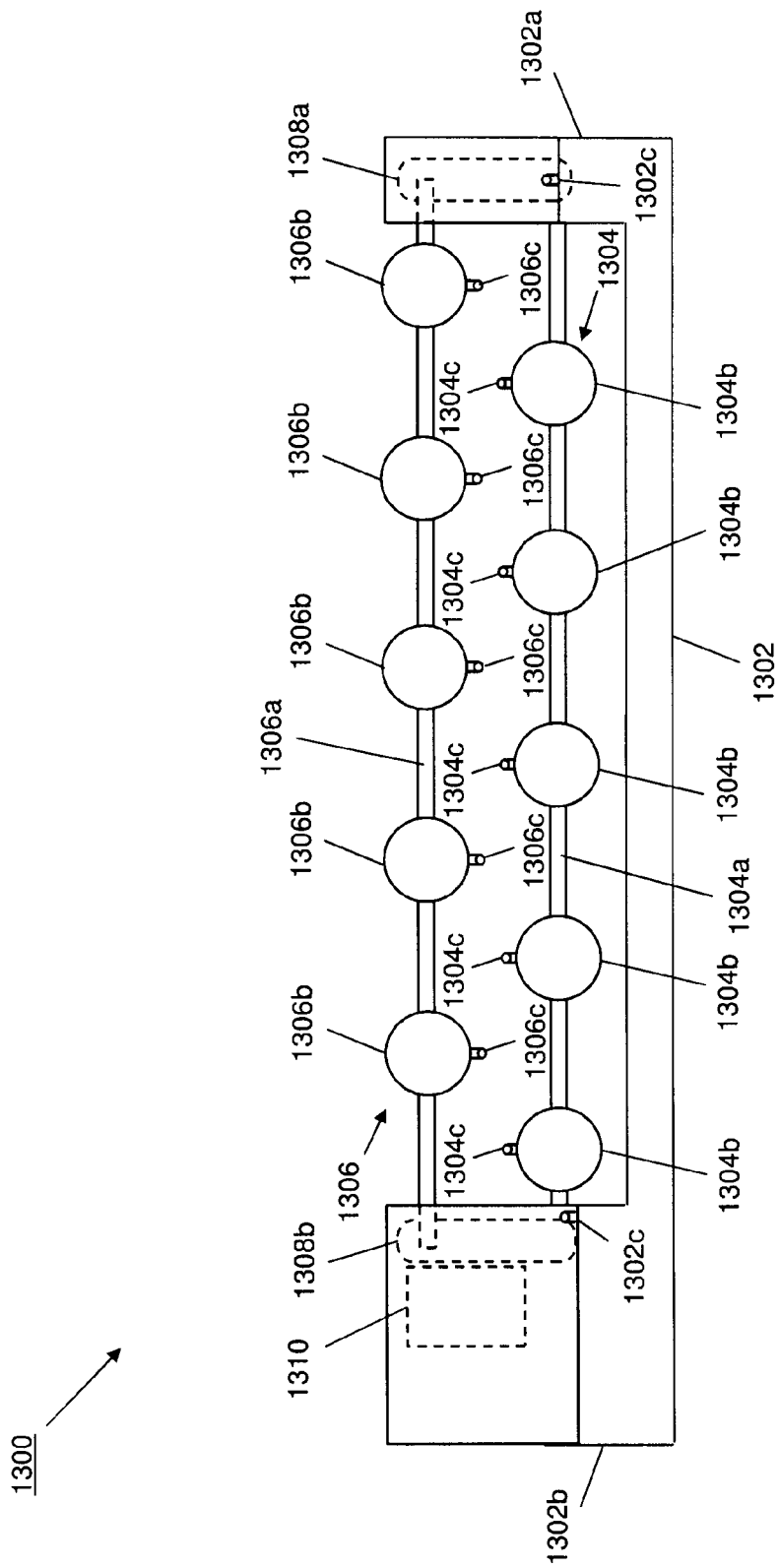
FIG. 13B is a side view illustrating an embodiment of the optical cable signaling device of FIG. 13A.

Referring now to FIGS. 13A and 13B, an embodiment of an optical cable signaling device 1300 is illustrated. As discussed above, the inventors of the present disclosure have developed the optical cable signaling device 1300 to provide the functionality of the mandrel control assembly 150 in FIG. 5, but with a more robust configuration and more uniform parameter change/modulation/attenuation. As such, in some embodiments the optical cable signaling device 1300 may be substituted for the mandrel control assembly 150 in the discussions above. In the illustrated embodiment, the optical cable signaling device 1300 includes a chassis 1302 having a first end 1302a, as well as a second end 1302b that is located opposite the chassis 1302 from the first end 1302a. In some embodiments, the chassis may include one or more securing elements such as, for example, the chassis securing elements 1302c that are located on the chassis portions adjacent the first end 1302a and the second end 1302b of the chassis 1302. While not illustrated, in some embodiments, the optical cable signaling device 1300 may include a case for housing the chassis 1302, or an attachment to the chassis 1302 that provides, for example, for the protection of the components of the optical cable signaling device 1300 and/or the transport of the optical cable signaling device 1300.

In an embodiment, the optical cable signaling device 1300 may include one or more optical cable manipulation subsystems such as, for example, the first optical cable manipulation subsystem 1304 and the second optical cable manipulation subsystem 1306 illustrated in FIGS. 13A and 13B. For example, the first optical cable manipulation subsystem 1304 may be fixed to the chassis 1302 via a first optical cable manipulation element support 1304a that extends between chassis portions adjacent the first end 1302a and the second end 1302b of the chassis 1302, with first optical cable manipulation elements 1304b extending from the first optical cable manipulation element support 1304a in a spaced apart orientation from each other. In addition, in some embodiments, the first optical cable manipulation subsystem 1304 may include one or more securing elements such as, for example, the first securing elements 1304c that are located on each of the first optical cable manipulation elements 1304b.

Furthermore, the second optical cable manipulation subsystem 1306 may be moveably coupled to the chassis 1302 via a second optical cable manipulation element support 1306a that extends between the chassis portions adjacent the first end 1302a and the second end 1302b of the chassis 1302, with second optical cable manipulation elements 1306b extending from the second optical cable manipulation element support 1306a in a spaced apart orientation from each other. In addition, in some embodiments, the second optical cable manipulation subsystem 1306 may include one or more securing elements such as, for example, the second securing elements 1306c that are located on each of the second optical cable manipulation elements 1306b. As illustrated in FIG. 13B, the second optical cable manipulation element support 1306a may be moveably coupled to the chassis 1302 via moveable couplings 1308a and 1308b that are provided in the chassis portions adjacent the first end 1302a and the second end 1302b of the chassis 1302, respectively. In addition, an optical cable signaling actuator 1310 may be located in the chassis portion adjacent the second end 1302b of the chassis 1302, with the cable signaling actuator 1310 coupled to the moveable coupling 1308b and/or the second optical cable manipulation element support 1306a to provide for movement of the second optical cable manipulation subsystem 1306 relative to the chassis 1302, discussed in further detail below. In a specific example, the optical cable signaling actuator 1310 may be provided by one or more servo motors, although other actuators will fall within the scope of the present disclosure as well. In the illustrated embodiment, the chassis portion adjacent the second end 1302b of the chassis 1302 includes a connector 1312 that may be configured to allow the optical cable signaling device 1300 to be coupled to a network (e.g., by providing the connector 1312 as an Ethernet connector), a computing device (e.g., by providing the connector 1312 as a Universal Serial Bus (USB) connector), and/or other management systems (e.g., by providing the connector 1312 as any other appropriate connector) to provide for the functionality discussed below.

In the specific example illustrated in FIGS. 13A and 13B, the optical cable signaling device 1300 is provided with the second optical cable manipulation subsystem 1306 moveable relative to the first optical cable manipulation subsystem 1304 from a first orientation in which the second optical cable manipulation subsystem 1306 is positioned above the first optical cable manipulation subsystem 1304 when the chassis 1302 is placed on a support surface (as illustrated in FIGS. 13A and 13B). However, one of skill in the art in possession of the present disclosure will recognize that the positioning and orientation of optical cable manipulation subsystems and/or optical cable manipulation elements may vary while still providing the functionality and benefits discussed below. Furthermore, in the specific example illustrated in FIGS. 13A and 13B, each of the first optical cable manipulation subsystem 1304 and the second optical cable manipulation subsystem 1306 includes five optical cable manipulation elements (i.e., the first optical cable manipulation elements 1304*a* and the second optical cable manipulation elements 1306*a*, respectively) that are each provided as cylinders that are each configured to physically manipulate a portion of an optical cable into a half-circle orientation, discussed in further detail below. However, one of skill in the art in possession of the present disclosure will recognize that the optical cable manipulation elements may be provided in different numbers, configurations, shapes, and/or having other characteristics that may still provide for changes in the parameter of the optical signal transmitted through the optical cable that can be recognized as information by endpoint devices, discussed in further detail below. Furthermore, a variety of additional features may be provided on the optical cable signaling device 1300 such as, for example, additional support elements (e.g., to support the optical cable manipulation subsystem(s)), additional cable routing features, and/or other features that would be apparent to one of skill in the art in possession of the present disclosure. As such, a wide variety of modification to the optical cable signaling device 1300 illustrated in FIGS. 13A and 13B is envisioned as falling within the scope of the present disclosure.

Figure 14:
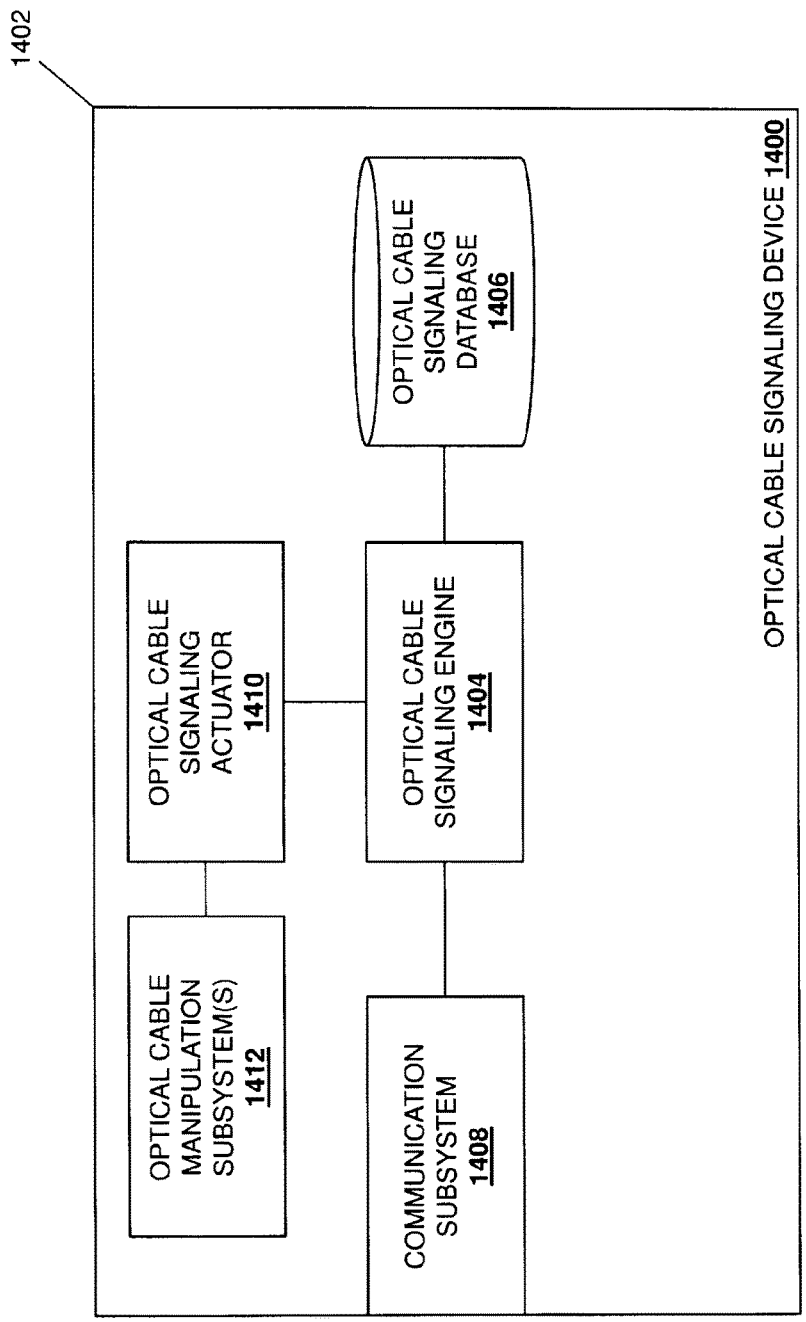
FIG. 14 is a schematic view illustrating an embodiment of the optical cable signaling device of FIGS. 13A and 13B.

Referring now to FIG. 14, an embodiment of an optical cable signaling device 1400 is illustrated that may be the optical cable signaling device 1300 discussed above with reference to FIGS. 13A and 13B. The optical cable signaling device 1400 includes a chassis 1402 that may be the chassis 1302 discussed above with reference to FIGS. 13A and 13B, and that may house some or all of the components of the optical cable signaling device 1400, only some of which are illustrated in FIG. 14. For example, the chassis 1402 may house a processing system (not illustrated, but which may include the processor 1002 discussed above with reference to FIG. 10) and a memory system (not illustrated, but which may include the system memory 1014 discussed above with reference to FIG. 10) that includes instructions that, when executed by the processing system, cause the processing system to provide an optical cable signaling engine 1404 that is configured to perform the functions of the optical cable signaling engines and optical cable signaling devices discussed below.

The chassis 1402 may also house a storage system (not illustrated, but which may include the storage device 1008 discussed above with reference to FIG. 10) that is coupled to the optical cable signaling engine 1404 (e.g., via a coupling between the storage system and the processing system) and that includes an optical cable signaling database 1406 that is configured to store information that may be utilized in providing the functionality discussed below. The chassis 1402 may also house a communication subsystem 1408 that is coupled to the optical cable signaling engine 1404 (e.g., via a coupling between the communication subsystem and the processing system) and that may include a network interface controller (NIC), a wireless communication subsystem (e.g., a BLUETOOTH® wireless communication subsystem, a Near Field Communication (NFC) subsystem, and/or other wireless communication subsystems known in the art), and/or a variety of other communication components known in the art. In an embodiment, the communication subsystem 1408 may include the connector 1312 discussed above with reference to FIG. 13A. The chassis 1402 may also house an optical cable signaling actuator 1410 that is coupled to the optical cable signaling engine 1404 (e.g., via a coupling between the optical cable signaling actuator 1410 and the processing system) and that may be provided by the optical cable signaling actuator 1310 discussed above with reference to FIG. 13B. Furthermore, the optical cable signaling actuator 1410 may be coupled to one or more optical cable manipulation subsystems 1412 that may be provided by the optical cable manipulation subsystem(s) described herein (e.g., the first optical cable manipulation subsystem 1304 and the second optical cable manipulation subsystem 1306 discussed above with reference to FIGS. 13A and 13B.)

Figure 15:
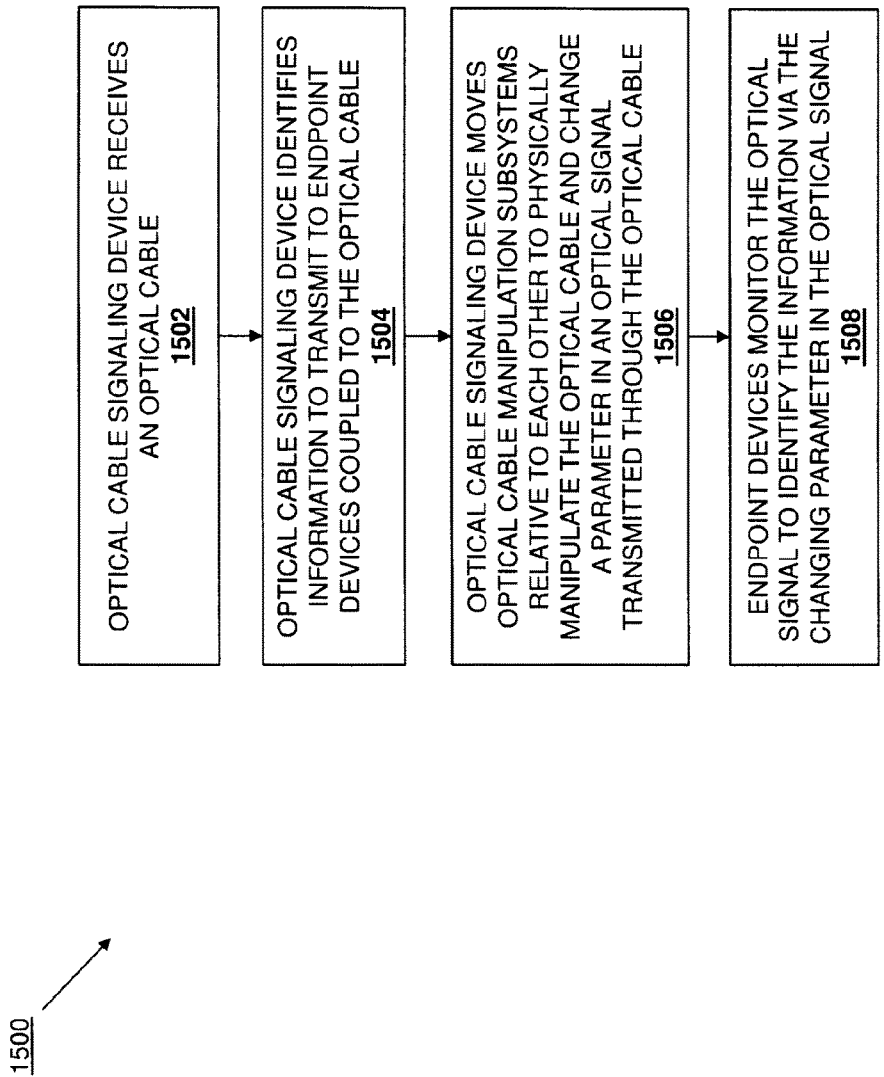
FIG. 15 is a flow chart illustrating an embodiment of a method for signaling using an optical cable.

Referring now to FIG. 15, an embodiment of a method 1500 for signaling using an optical cable is illustrated. As discussed below, the systems and methods of the present disclosure provide for signaling endpoint devices via an optical cable that connects those endpoint devices by physically manipulating the optical cable using at least one optical cable manipulation subsystem in order to change a parameter of an optical signal being transmitted through that optical cable. For example, a pair of optical cable manipulation subsystems may be moved relative to each other to engage and disengage an optical cable and physically manipulate that optical cable between a first orientation and a second orientation. The first orientation may provide the optical cable such that any bending of the optical cable does not substantially reduce a power parameter of the optical signal transmitted through the optical cable (i.e., the power parameter of that optical signal may remain at a value that exists when the provided optical cable is unbent or substantially straight), while the second orientation may bend the optical cable such that a power parameter of the optical signal transmitted through the optical cable is reduced by an amount that can be detected by the endpoint devices coupled together via that optical cable. As such, the changing parameter of the optical signal transmitted through the optical cable may be produced by the relative movement of, and engagement by, the optical cable manipulation subsystems, and the endpoints devices may monitor that changing parameter to identify information (e.g., binary 1's when the parameter is unchanged, binary 0's when the parameter is reduced). In experimental embodiments, the pair of optical cable manipulation subsystems each included five cylindrical optical cable manipulation elements that each bent the optical cable into a half circle orientation, providing the equivalent of 5 full turns of the optical cable on a conventional optical mandrel that reduced the power parameter of the optical signal by 5-9% relative to the unbent optical cable, providing a robust optical cable signaling device that enables out-of-band signaling via the optical cable (i.e., distinct from and in addition to any signaling/information provided via the optical signal itself).

Figure 16:
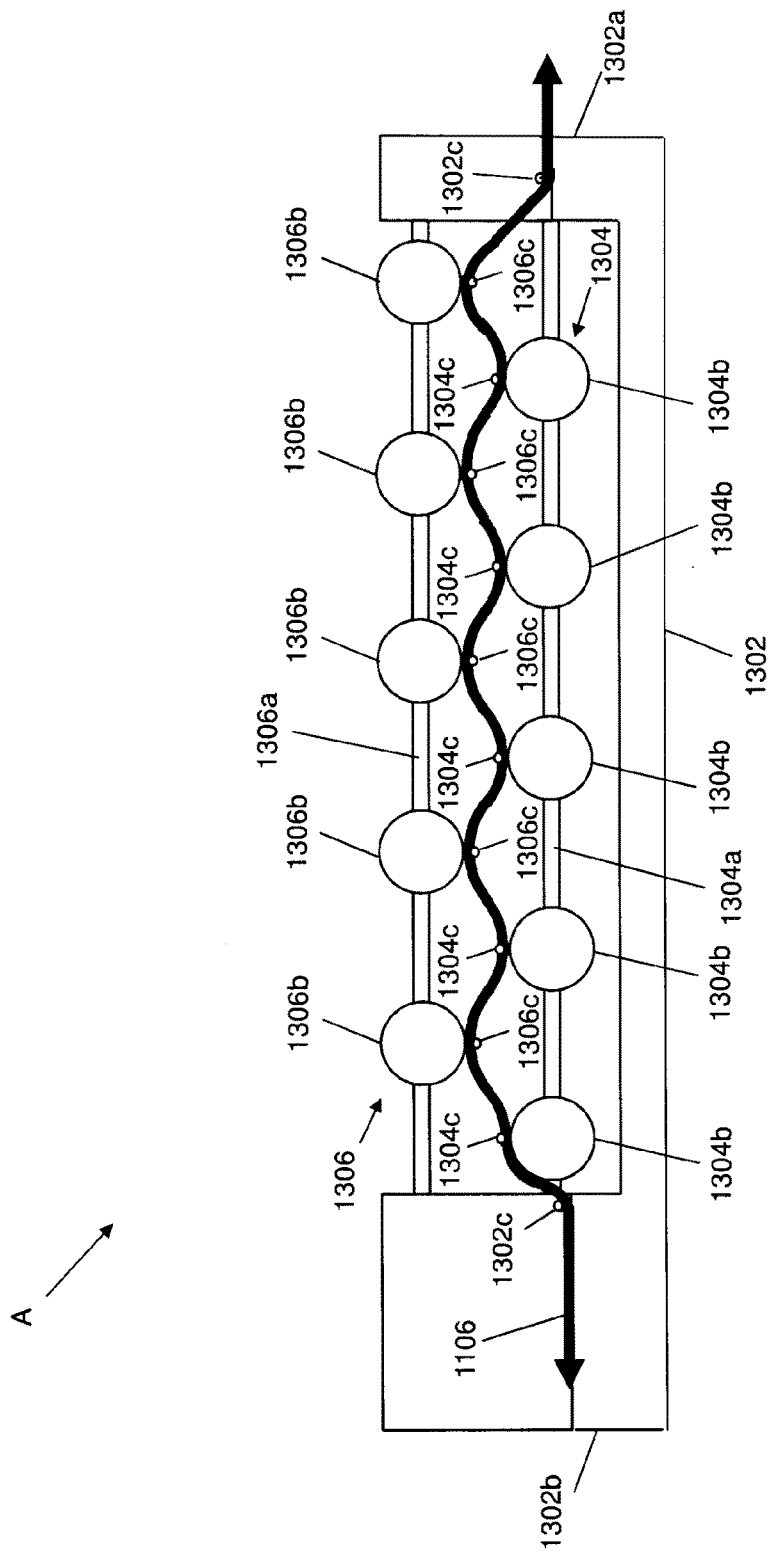
FIG. 16 is a side view illustrating an optical cable provided in the optical cable signaling device of FIGS. 13A and 13B.

The method 1500 begins at block 1502 where an optical cable signaling device receives an optical cable. Referring now to FIG. 16, an embodiment of an optical cable received by an optical cable signaling device is illustrated. In some examples, the optical cable signaling device may be an easily transportable device that a user or network administrator may carry with them to perform optical cable signaling to, for example, identify one or more endpoint devices that are connected via an optical cable of interest. However, in other examples, the optical cable signaling device may be a relatively stationary device in which a user or network administrator may provide the optical cable to, for example, provide for regular out-of-band signaling to the endpoint device(s) connected via that optical cable. However, while specific use examples are discussed herein, one of skill in the art in possession of the present disclosure will recognize a variety of other uses for the cable signaling system that will fall within the scope of the present disclosure as well. In the embodiment illustrated in FIG. 16, a user of the optical cable signaling system of the present disclosure may position the chassis 1302 of the optical cable signaling device 1300 on a support surface, and then position the cable 1106 (which may connect the endpoint devices 1102 and 1104 as discussed above) between the first optical cable manipulation subsystem 1304 and the second optical cable manipulation subsystem 1306.

For example, the user or network administrator may engage respective portions of the optical cable 1106 with each of the chassis securing elements 1302c on the chassis 1302, the first securing elements 1304c on the first optical cable manipulation elements 1304, and the second securing elements 1306c on the second optical cable manipulation elements 1306, as illustrated in FIG. 16. However, while the optical cable has been described as being secured to the chassis 1302, the first optical cable manipulation elements 1304, and the second optical cable manipulation elements 1306, in some embodiments the optical cable 1106 may simply be positioned between the first optical cable manipulation elements 1304 and the second optical cable manipulation elements 1306 without the need for securing the optical cable 1106 to the the securing elements 1302c, 1304c, and 1306c (i.e., the simple positioning of the optical cable 1106 may be sufficient to allow for the optical cable physical manipulation discussed below without the need to secure the optical cable 1106 to the optical cable signaling device 1300.) The positioning of the optical cable 1106 between the first optical cable manipulation subsystem 1304 and the second optical cable manipulation subsystem 1306 provides a portion of the optical cable 1106 (e.g., the portion of the optical cable 1106 between the chassis securing elements 1302) in a first orientation A, an embodiment of which is illustrated in FIG. 16. With the optical cable 1106 in the first orientation A, optical signals transmitted through the optical cable 1106 will exhibit a parameter having a first value. For example, with the optical cable 1106 in the first orientation A, optical signals transmitted through the optical cable 1106 will exhibit a power parameter having the first value discussed above with reference to FIG. 3 (e.g., a power parameter exhibited in a straight optical cable or an optical cable that has not been sufficiently bent to cause attenuation of that power parameter.)

In the illustrated example, the securing of the optical cable 1106 to the chassis 1302, the first optical cable manipulation elements 1304b, and the second optical cable manipulation elements 1304c may provide the optical cable 1106 with the bending illustrated in FIG. 16, but the chassis securing elements 1302c, the first securing elements 1304c and the second securing elements 1306c may be configured such that any bending of the optical cable 1106 does not change the parameter (e.g., by attenuating the power parameter) of the optical signal substantially from that exhibited by an optical signal transmitted through a substantially straight/unbent optical cable. Furthermore, one of skill in the art in possession of the present disclosure will recognize that the first optical cable manipulation elements 1304b and the second optical cable manipulation elements 1306b may be positioned closer than illustrated in FIG. 16 to further reduce any bending in the optical cable 1106 when positioned in the optical cable signaling device 1300 to ensure that that parameter of the optical signal is not changed (i.e., from that exhibited by an optical signal transmitted through a substantially straight/unbent optical cable.) Finally, one of skill in the art in possession of the present disclosure will recognize that embodiments where the optical cable 1106 is not secured to the chassis securing elements 1302c, the first securing elements 1304c and the second securing elements 1306c, the portion of the optical cable 1106 in the first orientation A may be substantially straight to provide the optical signal with the parameter exhibiting the first value.

The method 1500 then proceeds to block 1504 where the optical cable signaling device identifies information to transmit to endpoint devices coupled to the optical cable. In an embodiment, at block 1504, the optical cable signaling device 1300/1400 may identify information to transmit to the endpoint devices 1102 and/or 1104. For example, at block 1504, the optical cable signaling engine 1404 may receive information for transmission to the endpoint devices 1102 and/or 1104 via the connector 1312 provided in the communication subsystem 1408. As such, the information identified by the optical cable signaling device 1300 may be received through a network, received from a directly connected computing device, and/or received in a variety of manners that would be apparent to one of skill in the art in possession of the present disclosure. Furthermore, in some embodiments, the optical cable signaling device 1300/1400 may generate, determine, or retrieve (e.g., from the optical cable signaling database 1406) the information that is identified for transmission to the endpoint devices 1102 and/or 1104 at block 1504.

The method 1500 then proceeds to block 1506 where the optical cable signaling device moves optical cable manipulation subsystems relative to each other to physical manipulate the optical cable and change a parameter in an optical signal that is transmitted through the optical cable. In an embodiment, at block 1506, the optical cable signaling engine 1404 may send instructions to the optical cable signaling actuator 1310/1410 that cause the optical cable signaling actuator 1410 to cause relative movement of the optical cable manipulation subsystem(s) 1412 (e.g., the first optical cable manipulation subsystem 1304 and the second optical cable manipulation subsystem 1306.) For example, using the information identified at block 1504 of the method 1500, the optical able signaling engine 1404 may generate (or retrieve from the optical cable signaling database 1406) instructions that are configured to cause the relative movement of the first optical cable manipulation subsystem 1304 and the second optical cable manipulation subsystem 1306 discussed below, and then provide those instructions to the optical cable signaling actuator 1310/1410.

Figure 17:
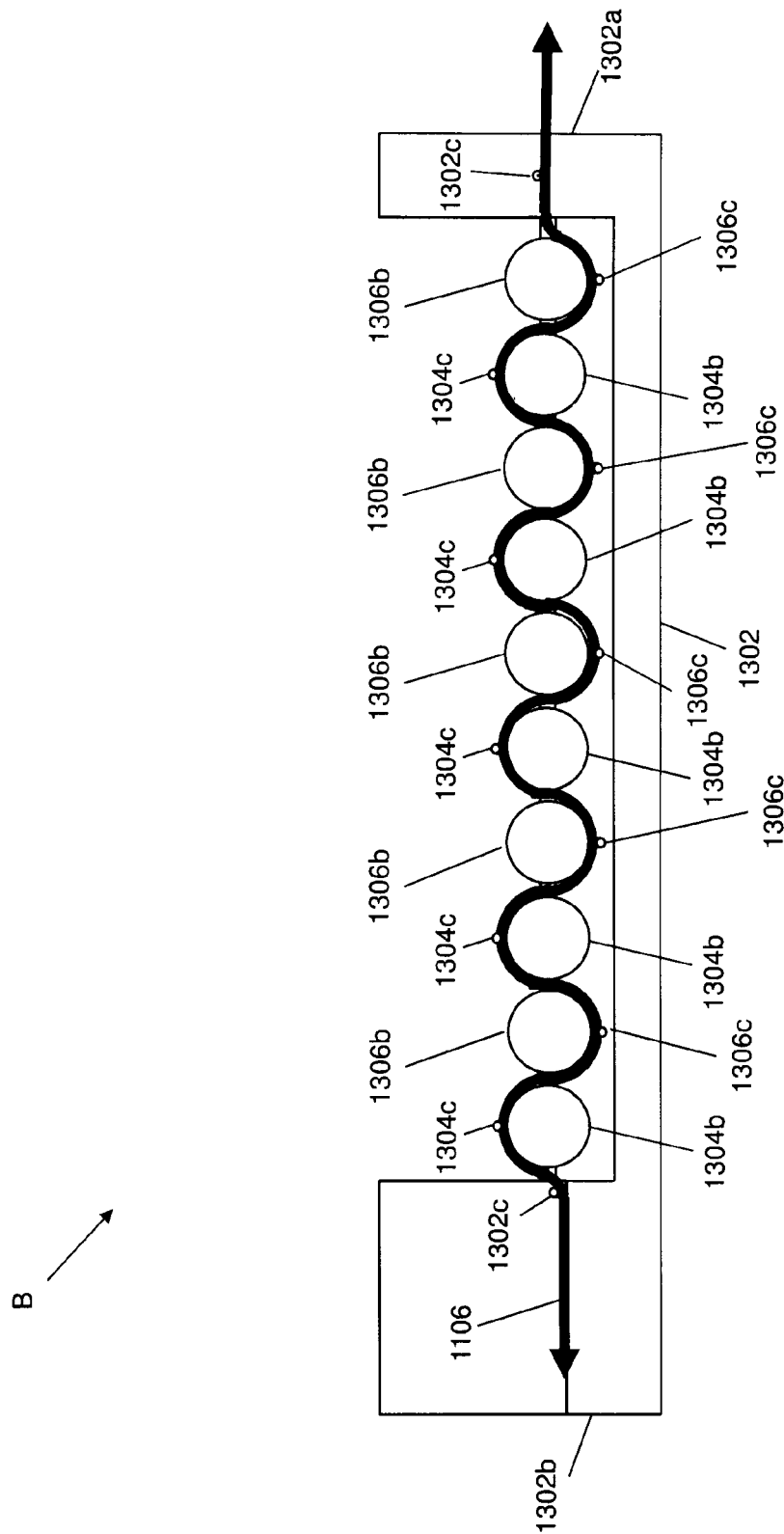
FIG. 17 is a side view illustrating an optical cable being manipulated by the optical cable signaling device of FIGS. 13A and 13B.

Referring now to FIGS. 16 and 17, at block 1506 the relative movement of the optical cable manipulation subsystem(s) 1412 (e.g., the first optical cable manipulation subsystem 1304 and the second optical cable manipulation subsystem 1306) may include the movement of the second optical cable manipulation subsystem 1306 towards the fixed first optical cable manipulation subsystem 1304 until the first optical cable manipulation subsystem 1304 and the second optical cable manipulation subsystem 1306 are provided in a second orientation B, illustrated in FIG. 17. In the example provided in FIG. 17, the second orientation B provides the first optical cable manipulation subsystem 1304 and the second optical cable manipulation subsystem 1306 such that the first optical cable manipulations elements 1304b and the second optical cable manipulation elements 1306b are located on a common plane that intersects the longitudinal axis of each of the cylinders that provide the first optical cable manipulation elements 1304b and the second optical cable manipulation elements 1306b. Furthermore, the second orientation B of the first optical cable manipulation subsystem 1304 and the second optical cable manipulation subsystem 1306 provides each section of the optical cable 1106 that engages a respective optical cable manipulation element 1304b/1306b in a half-circle orientation that replicates a half turn around a typical optical mandrel such as the mandrel 140 discussed above with reference to FIG. 4A. As such, in the example illustrated in FIG. 17, the optical cable 1106 is physically manipulated into 10 half circle orientations that replicate five turns around a typical optical mandrel.

The method 1500 then proceeds to block 1508 where the endpoint devices monitor the optical signal to identify the information via the changing parameter in the optical signal. In an embodiment, at block 1508, the optical cable signal receiving engine 1204 in the endpoint device 1200 (i.e., either of the endpoint devices 1102 and 1104) monitors the optical signal received via the optical cable 1106 to identify information from the changing parameter in the optical signal. As would be appreciated by one of skill in the art in possession of the present disclosure, the endpoint devices 1102 and 1104 may communicate through the optical cable 1106 via the transmission of the optical signal and, specifically, light pulses that provide the optical signal transmitted through the optical cable 1106. At block 1508, the endpoint devices 1102 and 1104 may exchange first information communicated via the light pulses that provide the optical signal, as well as receive second information communicated via the changing parameter of the optical signal that is provided at block 1506 via the physical manipulation of the optical cable 1106. However, at block 1508 the endpoint devices 1102 and/or 1104 need not actually transmit any information via light pulses that provide the optical signal, as parameters of that optical signal may be changed in response to physical manipulation of the optical cable 1106 even when that no light pulses are provided (e.g., when light is being transmitted through the optical cable without pulsing that light.)

For example, at block 1506, the optical cable signaling device may move the optical cable manipulation subsystems as discussed above to physically manipulate the optical cable between the first orientation A and the second orientation B. In response, at block 1508, the endpoint devices 1102 and/or 1104 may monitor the optical signal and identify binary 1's when the optical cable 1106 is in the first orientation A and the parameter of the optical signal has a first value, while identifying binary 0's when the optical cable 1106 is in the second orientation B and the parameter of the optical signal has been reduced to the second value, as discussed above with reference to FIG. 7. As such, the optical cable signal receiving engine 1204 in the endpoint device 1200 may receive identify a preamble that indicates that a message will be sent by the optical cable signaling device 1300/1400, and then subsequently identify that message, via parameter changes in the optical signal induced by the physical manipulation of the optical cable 1106. While the discussions above with reference to FIG. 7 provide examples of the timing of the physical manipulation of the optical cable 1106 and the resulting transmission of information via the changing parameter in the optical signal, one of skill in the art in possession of the present disclosure will recognize that different timings and information transmission may be enabled as the control over the parameter changes becomes more precise and immediate (e.g., via the optical cable signaling device discussed herein) and the monitoring mechanisms in the endpoint devices because more accurate.

Furthermore, while only a first orientation A and a second orientation B have been described to communicate binary 1's and binary 0's, some embodiments of the present disclosure may enable more granular information communication via the physical manipulation of the optical cable. For example, as the control over the parameter changes becomes more precise and immediate (e.g., via the optical cable signaling device discussed herein) and the monitoring mechanisms in the endpoint devices because more accurate, additional optical cable orientations may be provided (i.e., in addition to the first orientation A and a second orientation B) in order to produce additional values of the parameter of the optical signal (i.e., in addition to the first value and the second value discussed above) to communication more information than simply binary 1's and binary 0's. Furthermore, as such parameter change control and monitoring mechanisms become more precise, one of skill in the art in possession of the present disclosure will recognize that the optical cable manipulation subsystem(s) may be reduced in complexity (e.g., having fewer optical cable manipulation elements) while still providing detectable parameter changes in the optical signal that may be used to communicate the information to endpoint devices.

In some embodiments, in response to the identification of the information at block 1508, the endpoint device 1200 may perform an action. For example, the optical cable signaling system may be utilized to identify the endpoint devices 1102 and/or 1104 connected to the optical cable 1106 (e.g., a user or network administrator may identify the optical cable 1106 and wish to determine one or more of the endpoint devices that are connected to that optical cable 1106), and the user or network administrator may operate the optical cable signaling device 1300/1400 to send information that includes a message that requests that the endpoint devices 1102 and/or 1104 identify themselves. In response to receiving such a message, the optical cable signal receiving engine 1204 in the endpoint device 1200 may respond by generated and sending a message (e.g., an email, a text message, etc.) to a predefined recipient (or a recipient described in the message received by the endpoint device 1400 or included in the optical cable signal receiving database 1206) that identifies that endpoint device via, for example, an Internet Protocol (IP) address, a building identifier, a rack identifier, a device identifier, and/or any other identifying information known in the art. However, in other embodiments, the information sent via the operation of the optical cable signaling device 1300/1400 may be utilized by the endpoint devices 1102 and/or 1104 to perform a variety of other actions (a reset/reboot action, a firmware upgrade, a determination of whether an endpoint device shutdown should be allowed, etc.) that will fall within the scope of the present disclosure as well.

In the embodiments discussed above, the optical cable 1106 may be provided with a minimum amount of optical cable length that will ensure the ability to allow its physical manipulation between the first orientation A and the second orientation B ("optical cable slack length".) The following discussion provides a rough calculation to provide a minimum optical cable slack length that will ensure that the optical cable may be physically manipulated by the optical cable signaling device 1300 between the first orientation A (idealized as a straight optical cable rather than the mildly bent optical cable illustrated in FIG. 16) and the second orientation B. The minimum length of an optical cable in the first orientation A (idealized as a straight optical cable as discussed above, and disregarding gaps between the optical cable manipulation elements) can be expressed in terms of the diameter of the optical cable manipulation elements ("OCME's") as follows:

$$\text{cable length}_{(1st\ orientation)} = (\text{number of OCME's}) * (\text{OCME diameter})$$

The length of the optical cable in the second orientation can be expressed in terms of the diameter of the OCMEs as follows:

$$\text{cable length}_{(2nd\ orientation)} = (\text{number of } OCME's) * \left[\frac{1}{2} * (OCME's\ \text{circumference})\right]$$

$$= (\text{number of } OCME's) * \left[\frac{1}{2} * 2\pi * (OCME\ \text{radius})\right]$$

$$= (\text{number of } OCME's) * \frac{1}{2} * \pi * (OCME\ \text{diameter})$$

Thus, the optical cable slack length needed to ensure the optical cable can be physically manipulated from the first orientation to the second orientation is:

Optical cable slack length =

$$\text{cable length}_{(2nd\ orientation)} - \text{cable length}_{(1st\ orientation)} =$$

$$[(\text{number of } OCME's) * (\pi/2) * (OCME\ \text{diameter})] -$$

$$[(\text{number of } OCME's) * (OCME\ \text{diameter})] =$$

$$[(\text{number of } OCME's) * (OCME\ \text{diameter})](\pi/2 - 1)$$

The Telecommunications Industry Association/Engineering Industry Association (TIA/EIA) 568 B.1 7.1 standard and the International Organization for Standardization/International Electrotechnical Commission (ISO/IEC) TR 14763-3 6.22 standard (for producing power parameter attenuations) are provided below to provide some examples of optical cable slack length using standard sized optical cables provided on optical cable manipulation elements that exhibit typical optical mandrel dimensions such as those provided on the mandrel 140 discussed above with reference to FIG. 4A:

| Optical fiber core size | Standard | Number of wraps around Mandrel | Mandrel Diameter for 250 μm Buffered Fiber | Madrel Diameter for 3 mm (0.12) Jacketed Cable |
|---|---|---|---|---|
| 50 μm | TIA/EIA-568 B.1 7.1 | 5 | 25 mm (1.0 in) | 22 mm (0.9 in) |
|  | ISO/IEC TR 14763-3 6.22 | 5 | 15 mm (0.6 in) | 15 mm (0.6 in) |
| 62.5 μm | TIA/EIA-568 B.1 7.1 | 5 | 20 mm (0.8 in) | 17 mm (0.7 in) |
|  | ISO/IEC TR 14763-3 6.22 | 5 | 20 mm (0.8 in) | 20 mm (0.8 in) |

As discussed above, the equivalent of 5 wraps around a typical optical mandrel is provided by the ten optical cable manipulation elements of the illustrated embodiments, which each produce a half-circle orientation in the optical cable 1106 that is equivalent to half a wrap around a similarly sized optical mandrel. Thus, using the mandrel diameters above (between 0.6 inches and 1.0 inches) as our OCME diameters, we get:

$$\text{Optical cable slack length} = [(10) * (0.6\ \text{inches})](\pi/2 - 1)$$
$$= 3.4\ \text{inches}$$

$$\text{Optical cable slack length} = [(10) * (1.0\ \text{inches})](\pi/2 - 1)$$
$$= 5.7\ \text{inches}$$

However, as discussed above, the optical cable slack lengths above have been computed based on the assumption of a straight optical cable in the first orientation A, as well as disregarding gaps between the optical cable manipulation elements. As such, one of skill in the art in possession of the present disclosure will understand that addition length of optical cable may be required when the optical cable is not straight in the first orientation A (e.g., as illustrated in FIG. 16) and gaps between the optical cable manipulation elements are taken into account, and may utilize more complicated equations to determine the optical cable slack length (or simply add some optical cable length to the computed optical cable length that compensates for the simplifications made above.)

Thus, systems and methods have been described that provide for out-of-band signaling via physical manipulation of an optical cable that results in parameter changes in an optical signal that provide information transmission that is in addition to the information transmitted via light pulses that provide the optical signal. The systems and methods of the present disclosure utilize optical cable manipulation subsystem(s) that engage the optical cable to physically manipulate that optical cable to provide the parameter changes, and provide a robust configuration with relatively few moving parts that provide for uniform and reproducible physical manipulation of the optical cable that produces uniform changes in the parameter of the optical signal transmitted through that optical cable in order to accurately provide the out-of-band signaling discussed above.

A computer readable medium, which may also be referred to as computer readable memory or computer readable storage, encompasses volatile and non-volatile media, memory, and storage, whether programmable or not, whether randomly accessible or not, and whether implemented in a semiconductor, ferro-magnetic, optical, organic, or other suitable medium. IHSs may include two or more different types of computer readable media and, in such systems, program code may be stored, in whole or in part, in two or more different types of computer readable media.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicate the presence of stated features, operations, elements, and/or components, but does not preclude the presence or addition of one or more other features, operations, elements, components, and/or groups thereof.

What is claimed is:

1. An optical cable signaling system, comprising:
    an optical cable;
    an endpoint device that is connected to the optical cable; and
    an optical cable signaling device including:
        a first optical cable manipulation subsystem that includes a plurality of first optical cable manipulation elements;
        a second optical cable manipulation subsystem that includes a plurality of second optical cable manipulation elements, wherein the plurality of first optical cable manipulation elements and the second optical cable manipulation elements are configured to physically manipulate the optical cable into a half-circle orientation;
        an optical cable signaling actuator that is configured to move the first optical cable manipulation subsystem relative to the second optical cable manipulation subsystem to physically manipulate the optical cable such that a parameter of an optical signal transmitted through the optical cable changes; and
        an optical cable signaling engine that is configured to actuate the optical cable signaling actuator to communicate information to the endpoint device via changes in the parameter of the optical signal transmitted through the optical cable.

2. The system of claim 1, wherein the optical cable signaling device includes:
    at least one first securing element that is included on the first optical cable manipulation subsystem and that secures the optical cable to the first optical cable manipulation subsystem; and
    at least one second securing element that is included on the second optical cable manipulation subsystem and that secures the optical cable to the second optical cable manipulation subsystem.

3. The system of claim 1, wherein each of the first optical cable manipulation elements and each of the second optical cable manipulation elements includes a cylinder for physically manipulating the optical cable.

4. The system of claim 1, wherein the first optical cable manipulation subsystem includes at least five first optical cable manipulation elements that are each configured to physically manipulate the optical cable, and wherein the second optical cable manipulation subsystem includes at least five second optical cable manipulation elements that are each configured to physically manipulate the optical cable.

5. The system of claim 1, wherein the first optical cable manipulation subsystem and the second optical cable manipulation subsystem include a first relative orientation that causes the parameter of the optical signal transmitted through the optical cable to be interpreted by the endpoint device a binary zero, and wherein the first optical cable manipulation subsystem and the second optical cable manipulation subsystem include a second relative orientation that is different than the first relative orientation and that causes the parameter of the optical signal transmitted through the optical cable to be interpreted by the endpoint device as a binary one.

6. The system of claim 1, wherein the optical cable signaling device includes:
    a chassis, wherein the first optical cable manipulation subsystem is fixed to the chassis, and wherein the a second optical cable manipulation subsystem is moveable relative to the chassis and the first optical cable manipulation subsystem.

7. An optical cable signaling device including:
    a first optical cable manipulation subsystem that includes a plurality of first optical cable manipulation elements;
    a second optical cable manipulation subsystem that includes a plurality of second optical cable manipulation elements, wherein the plurality of first optical cable manipulation elements and the second optical cable manipulation elements are configured to physically manipulate the optical cable into a half-circle orientation;
    an optical cable signaling actuator that is configured to move the first optical cable manipulation subsystem relative to the second optical cable manipulation subsystem to physically manipulate an optical cable and change a parameter of an optical signal transmitted through the optical cable; and
    a cable signaling engine that is configured to actuate the cable signaling actuator to communicate, to an endpoint device that is coupled to the optical cable, information via the changes in the parameter of the optical signal that is transmitted through the optical cable.

8. The device of claim 7, further comprising:
    at least one first securing element that is included on the first optical cable manipulation subsystem and that secures the optical cable to the first optical cable manipulation subsystem; and
    at least one second securing element that is included on the second optical cable manipulation subsystem and that secures the optical cable to the second optical cable manipulation subsystem.

9. The device of claim 7, wherein each of the first optical cable manipulation elements and each of the second optical cable manipulation elements includes a cylinder for physically manipulating the optical cable.

10. The device of claim 7, wherein the first optical cable manipulation subsystem and the second optical cable manipulation subsystem include a first relative orientation that causes the parameter of the optical signal transmitted through the optical cable to be interpreted by the endpoint device a binary zero, and wherein the first optical cable manipulation subsystem and the second optical cable manipulation subsystem include a second relative orientation that is different than the first relative orientation and that causes the parameter of the optical signal transmitted through the optical cable to be interpreted by the endpoint device as a binary one.

11. The device of claim 7, further comprising:
a chassis, wherein the first optical cable manipulation subsystem is fixed to the chassis, and wherein the second optical cable manipulation subsystem is moveable relative to the chassis and the first optical cable manipulation subsystem.

12. A method for signaling using an optical cable, comprising:
identifying, by an optical cable signaling device, information to transmit to an endpoint device that is coupled to an optical cable;
moving, by the optical cable signaling device, a first optical cable manipulation subsystem that includes a plurality of first optical cable manipulation elements relative to a second optical cable manipulation subsystem that includes a plurality of second optical cable manipulation elements to physically manipulate the optical cable, wherein the plurality of first optical cable manipulation elements and the second optical cable manipulation elements are configured to physically manipulate the optical cable into a half-circle orientation;
changing, by the optical cable signaling device via the physical manipulation of the optical cable, a parameter of an optical signal transmitted through the optical cable; and
communicating, by the optical cable signaling device to the endpoint device that is coupled to the optical cable, the information via the changes in the parameter of the optical signal that is transmitted through the optical cable.

13. The method of claim 12, further comprising:
receiving, by at least one first securing element that is included on the first optical cable manipulation subsystem, the optical cable to secure the optical cable to the first optical cable manipulation subsystem; and
receiving, by at least one second securing element that is included on the second optical cable manipulation subsystem, the optical cable to secure the optical cable to the second optical cable manipulation subsystem.

14. The method of claim 12, further comprising:
physically manipulating, by each of a plurality of first optical cable manipulation elements on the first optical cable manipulation subsystem, the optical cable into the half-circle orientation, and
physically manipulating, by each of a plurality of second optical cable manipulation elements on the second optical cable manipulation subsystem, the optical cable into the half-circle orientation.

15. The method of claim 12, wherein each of the first optical cable manipulation elements and each of the second optical cable manipulation elements includes a cylinder for physically manipulating the optical cable.

16. The method of claim 12, wherein the first optical cable manipulation subsystem includes at least five first optical cable manipulation elements that are each configured to physically manipulate the optical cable, and wherein the second optical cable manipulation subsystem includes at least five second optical cable manipulation elements that are each configured to physically manipulate the optical cable.

17. The method of claim 12, wherein the changing the parameter of the optical signal transmitted through the optical cable includes:
providing, by the optical cable signaling device, the first optical cable manipulation subsystem and the second optical cable manipulation subsystem in a first relative orientation that causes the parameter of the optical signal transmitted through the optical cable to be interpreted by the endpoint device a binary zero; and
moving, by the optical cable signaling device, the first optical cable manipulation subsystem and the second optical cable manipulation subsystem into a second relative orientation that is different than the first relative orientation and that causes the parameter of the optical signal transmitted through the optical cable to be interpreted by the endpoint device as a binary one.

18. The method of claim 12, wherein the first optical cable manipulation subsystem is fixed to a chassis of the optical cable signaling device, and wherein the second optical cable manipulation subsystem is moveable relative to the chassis and the first optical cable manipulation subsystem.

* * * * *